United States Patent
Liu et al.

(10) Patent No.: US 12,541,231 B2
(45) Date of Patent: Feb. 3, 2026

(54) ROTATING MECHANISM AND FOLDABLE ELECTRONIC DEVICE

(71) Applicant: Honor Device Co., Ltd., Shenzhen (CN)

(72) Inventors: Kun Liu, Shenzhen (CN); Shengxian Huang, Shenzhen (CN); Ruihao Chen, Shenzhen (CN); Shaohong Dong, Shenzhen (CN); Yandang Qiao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 112 days.

(21) Appl. No.: 18/704,277

(22) PCT Filed: May 5, 2023

(86) PCT No.: PCT/CN2023/092305
§ 371 (c)(1),
(2) Date: Apr. 24, 2024

(87) PCT Pub. No.: WO2023/226715
PCT Pub. Date: Nov. 30, 2023

(65) Prior Publication Data
US 2024/0419220 A1 Dec. 19, 2024

(30) Foreign Application Priority Data
May 23, 2022 (CN) .......................... 202210565212.9

(51) Int. Cl.
*G06F 1/16* (2006.01)
*F16C 11/10* (2006.01)

(52) U.S. Cl.
CPC ............ *G06F 1/1681* (2013.01); *F16C 11/10* (2013.01)

(58) Field of Classification Search
CPC ...... G06F 1/1681; G06F 1/1616; F16C 11/10; F16C 11/04; H04M 1/02; H04M 1/022; H05K 5/0226
See application file for complete search history.

(56) References Cited

U.S. PATENT DOCUMENTS 10,534,407 B2 * 1/2020 Alva ................... F03G 7/06145
10,677,307 B2 * 6/2020 Aagaard ............... G06F 1/1616
(Continued)

FOREIGN PATENT DOCUMENTS

CN 105805151 A 7/2016
CN 208445595 U 1/2019
(Continued)

*Primary Examiner* — Anthony M Haughton
*Assistant Examiner* — Theron S Milliser
(74) *Attorney, Agent, or Firm* — Slater Matsil, LLP

(57) ABSTRACT

This application provides a rotating mechanism and a foldable electronic device. The rotating mechanism includes a fastening base, a first synchronization swing arm, a second synchronization swing arm, and a damping member. The first synchronization swing arm and the second synchronization swing arm are respectively mounted on two opposite sides of the fastening base in a width direction and are rotatably connected to the fastening base. The damping member includes a baffle plate and a damping body, the damping body is connected between the first synchronization swing arm and the baffle plate, two opposite ends of the damping body are disposed along a length direction of the fastening base, and the damping body is made of a shape memory alloy.

17 Claims, 14 Drawing Sheets

(56) References Cited

U.S. PATENT DOCUMENTS

| | | | |
|---|---|---|---|
| 10,851,571 B2* | 12/2020 | Meyers | G06F 1/1681 |
| 11,175,704 B2* | 11/2021 | Alva | G06F 1/1692 |
| 11,353,933 B2* | 6/2022 | Xu | G06F 1/1681 |
| 11,550,358 B2* | 1/2023 | Cheng | H04M 1/022 |
| 11,573,611 B2* | 2/2023 | Channaiah | E05D 11/105 |
| 11,744,030 B2 | 8/2023 | Zhang et al. | |
| 12,007,809 B2* | 6/2024 | Cheng | G06F 1/1681 |
| 2005/0046374 A1* | 3/2005 | Ogawa | G06F 1/1616 318/614 |
| 2013/0139355 A1* | 6/2013 | Lee | G06F 1/1681 16/354 |
| 2019/0129476 A1* | 5/2019 | Alva | G06F 1/169 |
| 2019/0179373 A1 | 6/2019 | Cheng et al. | |
| 2019/0323573 A1* | 10/2019 | Aagaard | G06F 1/1616 |
| 2020/0142454 A1* | 5/2020 | Alva | F03G 7/0614 |
| 2020/0318407 A1* | 10/2020 | Meyers | G06F 1/1681 |
| 2021/0064096 A1* | 3/2021 | Channaiah | E05D 11/105 |
| 2021/0181808 A1 | 6/2021 | Liao et al. | |
| 2021/0303032 A1 | 9/2021 | Hong et al. | |
| 2021/0318723 A1* | 10/2021 | Cheng | G06F 1/1637 |
| 2021/0333840 A1* | 10/2021 | Channaiah | G06F 1/1679 |
| 2021/0355988 A1* | 11/2021 | Cheng | G06F 1/1681 |
| 2021/0365078 A1 | 11/2021 | Chen et al. | |
| 2021/0373610 A1* | 12/2021 | Xu | F16M 11/10 |
| 2023/0111233 A1* | 4/2023 | Cheng | G06F 1/1637 345/173 |
| 2023/0229189 A1 | 7/2023 | Li et al. | |
| 2024/0007554 A1 | 1/2024 | Cheng et al. | |
| 2024/0073303 A1 | 2/2024 | Zhang et al. | |
| 2024/0340365 A1 | 10/2024 | Liao et al. | |

FOREIGN PATENT DOCUMENTS

| | | |
|---|---|---|
| CN | 210225477 U | 3/2020 |
| CN | 110985524 A | 4/2020 |
| CN | 111131568 A | 5/2020 |
| CN | 210830134 U | 6/2020 |
| CN | 111609029 A | 9/2020 |
| CN | 112178041 A | 1/2021 |
| CN | 113067924 A | 7/2021 |
| CN | 113282136 A | 8/2021 |
| CN | 113404766 A | 9/2021 |
| CN | 113805646 A | 12/2021 |
| CN | 113864324 A | 12/2021 |
| CN | 113923279 A | 1/2022 |
| CN | 114060398 A | 2/2022 |
| CN | 114063706 A | 2/2022 |
| DE | 202018101276 U1 | 4/2018 |
| EP | 4063674 B1 | 4/2024 |
| JP | 2020045914 A | 3/2020 |
| WO | 2021115462 A1 | 6/2021 |

* cited by examiner

ROTATING MECHANISM AND FOLDABLE ELECTRONIC DEVICE

CROSS-REFERENCE TO RELATED APPLICATIONS

This application is a national stage of International Application No. PCT/CN2023/092305, filed on May 5, 2023, which claims priority to Chinese Patent Application No. 202210565212.9, filed on May 23, 2022. The disclosures of both of the aforementioned applications are hereby incorporated by reference in their entireties.

TECHNICAL FIELD

This application relates to the field of electronic product technologies, and in particular, to a rotating mechanism and a foldable electronic device.

BACKGROUND

With development of science and technology, electronic devices (such as a mobile phone and a tablet computer) have developed from bar-type devices into foldable devices in terms of appearances (ID) and shapes. The foldable devices have large screens in unfolded states, fully satisfying visual experience of consumers. The foldable devices are small in volume and convenient to carry in folded states. Most of rotating mechanisms in the conventional technology use mechanical force of springs to provide damping force, to improve damping hand feeling when users use the rotating mechanisms. However, in the conventional technology, to achieve specific damping hand feeling, quantities of parts of rotating structures need to be increased and the rotating structures are complex. This increases assembly difficulty of the parts of the rotating mechanisms and fitting difficulty between a plurality of parts, increases costs of products, and affects consistency of the products.

SUMMARY

This application provides a rotating mechanism and a foldable electronic device, to resolve problems that assembly difficulty of the rotating mechanism in the conventional technology is great because of excessive parts and costs of the product are increased.

According to a first aspect, this application provides a rotating mechanism, including a fastening base, a first synchronization swing arm, a second synchronization swing arm, and a damping member. The first synchronization swing arm and the second synchronization swing arm are respectively mounted on two opposite sides of the fastening base in a width direction and are rotatably connected to the fastening base. The damping member includes a baffle plate and a damping body, one end of the damping body is connected to the first synchronization swing arm, the other end of the damping body is connected to the baffle plate, two opposite ends of the damping body are disposed along a length direction of the fastening base, and the damping body is made of a shape memory alloy. When the first synchronization swing arm and the second synchronization swing arm are in a folded state, the damping body is in a first state, where the first state is an initial state of the damping body. The first synchronization swing arm is rotated relative to the fastening base to drive one end of the damping body to rotate, the first synchronization swing arm and the second synchronization swing arm are relatively unfolded from the folded state, and the damping body is in a second state, where the second state is that the damping body is deformed and generates damping force relative to the first synchronization swing arm.

In this embodiment, the first synchronization swing arm and the second synchronization swing arm can be rotated relative to each other under the action of external force exerted on the rotating mechanism. When the first synchronization swing arm is rotated, one end of the damping body is driven to rotate relative to the fastening base. One end that is of the damping body and that is connected to the baffle plate remains stationary relative to the fastening base. The damping body is deformed when the first synchronization swing arm is rotated. Because the damping body is made of a shape memory alloy, the damping body can generate damping force during deformation. When the damping body is in the first state, the first synchronization swing arm and the second synchronization swing arm are relatively folded, and the rotating mechanism is in a folded state. In a process in which the rotating mechanism is relatively unfolded from the folded state, the first synchronization swing arm is rotated to exert external force on the damping body, the damping body is deformed from the first state to the second state, and the damping body generates damping force resisting the external force during deformation under stress, to provide damping hand feeling.

In a possible implementation, when the first synchronization swing arm and the second synchronization swing arm are in a flattened state, the damping body is in a third state, where the third state is that the damping body is in a deformed state and that the damping body generates damping force relative to the first synchronization swing arm.

In this embodiment, when the rotating mechanism is in a flattened state, the first synchronization swing arm and the second synchronization swing arm are in the flattened state, and the damping body is in the third state. When the damping body is in the third state, the damping body can keep the first synchronization swing arm and the second synchronization swing arm in the flattened state, thereby implementing flattening positioning of the rotating mechanism. When the rotating mechanism in the flattened state is exerted by external force, the damping body in the third state generates damping force resisting the external force. When the external force reaches a specific value, the damping body is deformed again from the third state and provides damping hand feeling.

In a possible implementation, a deformation amount of the damping body in the second state is less than that in the third state.

In this embodiment, when the rotating mechanism is in a folded state, the damping body is in the first state. When the rotating mechanism is in a flattened state, the damping body is in the third state. When the rotating mechanism is in a state between a folded state and an unfolded state, the damping body is in the second state. The first state of the damping body is a non-deformed state, that is, the initial state of the damping body. When the damping body changes from the first state to the second state, the deformation amount of the damping body increases and damping force is generated, and then there is hand feeling in an unfolding process. When the damping body changes from the second state to the third state, the deformation amount of the damping body increases.

In a possible implementation, the damping force of the damping body enables the first synchronization swing arm and the second synchronization swing arm to be positioned relative to the fastening base.

In this embodiment, the damping body is deformed when the first synchronization swing arm is rotated, and after the first synchronization swing arm stops being rotated, the damping body can keep in a deformed state. In this case, the damping body may be in the second state or the third state. The damping body can keep stable in the second state or the third state, so that the rotating mechanism can keep hovering. It can be understood that the damping body can implement hovering of the first synchronization swing arm in the second state (at any angle in the unfolding process) or the third state, to implement hovering of the rotating mechanism. In this way, no other positioning structures need to be disposed, occupied space is reduced, and a structure is simplified.

In a possible implementation, the damping body has a first intermediate state, a deformation amount in the first intermediate state is less than that in the third state, and the first preset temperature is applied to the damping body in the first intermediate state, so that a microstructure of the damping body changes at the first preset temperature, and the damping body changes from the first intermediate state to the third state.

In this embodiment, the deformation amount of the damping body in the first intermediate state may be a deformation amount generated by rebound of the damping body in the third state. In the process in which the rotating mechanism is relatively unfolded from the folded state under the action of external force, the first synchronization swing arm and the second synchronization swing arm are rotated relative to each other, and the damping body is deformed. After the first synchronization swing arm and the second synchronization swing arm are relatively flattened, that is, after the damping body reaches the third state, the external force is removed, the damping body rebounds slightly, and the deformation amount of the damping body decreases. In this case, the damping body is in the first intermediate state, and the first synchronization swing arm and the second synchronization swing arm are in a general flattened state but not in the flattened state. The first preset temperature is applied to the damping member, so that the damping body can change to the third state, and the first synchronization swing arm and the second synchronization swing arm are in the flattened state. Because the damping body is made of a shape memory alloy, a shape of the damping body can be trained at the first preset temperature, and the first preset temperature is set as a corresponding temperature of the damping body in the third state.

In a possible implementation, when the first synchronization swing arm and the second synchronization swing arm change from the flattened state to the folded state, the damping member changes from the third state to a second intermediate state, a deformation amount in the second intermediate state is greater than that in the first state, and a second preset temperature is applied to the damping body in the second intermediate state, so that the microstructure of the damping body changes at the second preset temperature, and the damping body changes from the second intermediate state to the first state.

In this embodiment, the shape of the shape memory alloy can be trained as different shapes at different temperatures, and the second preset temperature is set as a corresponding temperature of the damping body in the first state. The deformation amount of the damping body in the second intermediate state may be a deformation amount generated by rebound of the damping body in the first state. In a process in which the rotating mechanism is relatively folded from the unfolded state under the action of external force, the first synchronization swing arm and the second synchronization swing arm are rotated relative to each other, and the damping body is deformed. After the first synchronization swing arm and the second synchronization swing arm are relatively folded, that is, after the damping body reaches the first state, the external force is removed, the damping body rebounds slightly, and the deformation amount of the damping body increases. In this case, the damping body is in the second intermediate state, and the first synchronization swing arm and the second synchronization swing arm are in a general folded state but not in the folded state. The second preset temperature is applied to the damping member, so that the damping body can change to the first state, and the first synchronization swing arm and the second synchronization swing arm are in the folded state. Because the damping body is made of a shape memory alloy, the shape of the damping body can be trained at the second preset temperature, and the second preset temperature is set as a corresponding temperature of the damping body in the first state.

In a possible implementation, there are two damping bodies: a first damping body and a second damping body, one end of the first damping body is connected to the first synchronization swing arm, the other end of the first damping body is connected to the baffle plate, one end of the second damping body is connected to the second synchronization swing arm, and the other end of the second damping body is connected to the baffle plate.

In this embodiment, two damping bodies are disposed and are respectively connected to the first synchronization swing arm and the second synchronization swing arm, so that damping force generated by the damping bodies in a deformation process can be simultaneously exerted on the first synchronization swing arm and the second synchronization swing arm. This optimizes the damping hand feeling provided by the rotating mechanism.

In a possible implementation, the first synchronization swing arm and the second synchronization swing arm are relatively unfolded, the first damping body exerts force whose direction is opposite to a movement direction of the first synchronization swing arm on the first synchronization swing arm, and the second damping body exerts force whose direction is opposite to a movement direction of the second synchronization swing arm on the second synchronization swing arm.

In this embodiment, a direction of the damping force provided by the damping body is opposite to the movement direction of the first synchronization swing arm, to generate damping hand feeling and implement hovering of the first synchronization swing arm when the damping force is large enough.

In a possible implementation, the first synchronization swing arm is rotated through external force, the first synchronization swing arm is rotated away from the second synchronization swing arm, and after the external force is removed, resilience of the damping body enables the first synchronization swing arm and the second synchronization swing arm to be relatively folded.

In this embodiment, the resilience of the damping body enables the first synchronization swing arm and the second synchronization swing arm to be automatically folded, so that an operation process of a user can be simplified.

In a possible implementation, the rotating mechanism further includes a synchronization gear and a first connecting shaft, both the first synchronization swing arm and the second synchronization swing arm are connected to the synchronization gear, one end of the first connecting shaft is connected to the synchronization gear, the other end of the first connecting shaft is connected to the baffle plate, a length direction of the first connecting shaft is the same as that of the fastening base, and the first connecting shaft is spaced from the fastening base; and the damping body includes a plurality of strip-shaped bodies, one end of the strip-shaped body of the damping body is connected to the synchronization gear, the other end of the strip-shaped body of the first damping body is connected to the baffle plate, and the plurality of strip-shaped bodies are disposed around the first connecting shaft.

In this embodiment, when the first synchronization swing arm is rotated relative to the base, the second synchronization swing arm can be driven to rotate through transmission of the synchronization gear. With rotation of the first synchronization swing arm, the damping body is deformed, and the strip-shaped bodies are twisted along an outer edge of a circumferential surface of the first connecting shaft, and the strip-shaped bodies are deformed and generate damping force.

In a possible implementation, the rotating mechanism further includes a synchronization gear, a first connecting shaft, and a second connecting shaft, both the first synchronization swing arm and the second synchronization swing arm are connected to the synchronization gear, one end of the first connecting shaft is connected to the synchronization gear, the other end of the first connecting shaft is connected to the baffle plate, one end of the second connecting shaft is connected to the synchronization gear, the other end of the second connecting shaft is connected to the baffle plate, length directions of the first connecting shaft and the second connecting shaft are the same as that of the fastening base, and the first connecting shaft and the second connecting shaft are spaced from the fastening base; and the first damping body and the second damping body each include a plurality of strip-shaped bodies, one end of the strip-shaped body of the first damping body is connected to the synchronization gear, the other end of the strip-shaped body of the first damping body is connected to the baffle plate, the plurality of strip-shaped bodies of the first damping body are disposed around the first connecting shaft, one end of each of the plurality of strip-shaped bodies of the second damping body is connected to the synchronization gear, the other end of each of the plurality of strip-shaped bodies of the second damping body is connected to the baffle plate, and the plurality of strip-shaped bodies of the second damping body are disposed around the second connecting shaft.

In a possible implementation, the synchronization gear includes a first gear, intermediate gears, and a second gear, the intermediate gears are located between the first gear and the second gear and are engaged with the first gear and the second gear, the first synchronization swing arm is invariably connected to the first gear, the second synchronization swing arm is invariably connected to the second gear, and rotation directions of the first gear and the second gear are opposite.

In this embodiment, when the first synchronization swing arm rotates, the first gear can be driven to rotate, and the second gear is driven to rotate through the intermediate gears, to drive the second synchronization swing arm to rotate. In this implementation, the first synchronization swing arm and the second synchronization swing arm can be synchronously rotated by disposing the synchronization gear.

In a possible implementation, the rotating mechanism further includes a third connecting shaft and a fourth connecting shaft, and the intermediate gears include a third gear and a fourth gear; and one end of each of the first connecting shaft, the second connecting shaft, the third connecting shaft, and the fourth connecting shaft is connected to the base and these connecting shafts are disposed in parallel, the other ends of the third connecting shaft and the fourth connecting shaft are both connected to the baffle plate, the first gear is sleeved on the first connecting shaft, the second gear is sleeved on the second connecting shaft, the third gear is sleeved on the third connecting shaft, and the fourth gear is sleeved on the fourth connecting shaft.

In this embodiment, rotation of the first synchronization swing arm drives the first gear to rotate, the first gear drives the third gear to rotate, rotation directions of the third gear and the first gear rotate are opposite, the third gear drives the fourth gear to rotate, rotation directions of the fourth gear and the third gear are opposite, the fourth gear drives the second gear to rotate, and rotation directions of the second gear and the fourth gear are opposite. Therefore, the rotation directions of the second gear and the first gear are opposite, so that rotation directions of the first synchronization swing arm and the second synchronization swing arm are opposite. In this way, the first synchronization swing arm and the second synchronization swing arm can be relatively folded and relatively unfolded.

In a possible implementation, the rotating mechanism further includes a first fastening plate and a second fastening plate, the first fastening plate and the second fastening plate are respectively located at the two opposite sides of the fastening base in the width direction, the first fastening plate is slidably connected to the first synchronization swing arm, and the second fastening plate is slidably connected to the second synchronization swing arm.

In this embodiment, the first fastening plate is configured to invariably connect to a first housing of a foldable electronic device, and the second fastening plate is configured to invariably connect to a second housing of the foldable electronic device. When the first housing is rotated relative to the fastening base, the first fastening plate is driven to rotate, to drive the first synchronization swing arm to rotate, and then the synchronization gear drives the second synchronization swing arm to rotate, so that the second synchronization swing arm drives the second housing to rotate relative to the fastening base. In this way, folding or unfolding of the rotating mechanism is implemented, and rotation stability of the rotating mechanism and the foldable electronic device can be ensured.

In a possible implementation, the fastening base is provided with a first rotating groove and a second rotating groove, the first rotating groove and the second rotating groove are disposed opposite to each other, the rotating mechanism includes a first main swing arm and a second main swing arm, the first main swing arm is mounted in the first rotating groove and is capable of sliding along the first rotating groove, the first main swing arm is connected to the first fastening plate, the second main swing arm is mounted in the second rotating groove and is capable of sliding along the second rotating groove, and the second main swing arm is connected to the second fastening plate; and when the first fastening plate is rotated relative to the fastening base, the first main swing arm can be driven to rotate relative to the fastening base, and when the second fastening plate is rotated relative to the fastening base, the second main swing arm can be driven to rotate relative to the fastening base.

In this embodiment, the first main swing arm is disposed and the first main swing arm is invariably connected to the first fastening plate, so that when the first fastening plate is rotated relative to the fastening base, the first main swing arm can be driven to rotate relative to the fastening base. The second main swing arm is disposed and the second main swing arm is invariably connected to the second fastening plate, so that when the second fastening plate is rotated relative to the fastening base, the second main swing arm can be driven to rotate relative to the fastening base. This further improves rotation stability of the rotating mechanism and the foldable electronic device.

In a possible implementation, the rotating mechanism further includes a locking member, the first synchronization swing arm is rotated through external force and is in an unfolded state or a folded state relative to the second synchronization swing arm, and the locking member fastens the first synchronization swing arm and the second synchronization swing arm.

In this embodiment, the rotating mechanism can be kept in a folded state or an unfolded state by disposing the locking member.

According to a second aspect, this application further provides a foldable electronic device, including a first housing, a second housing, a display screen, and the foregoing rotating mechanism. The rotating mechanism is connected between the first housing and the second housing, the display screen is mounted on the first housing, the second housing, and the rotating mechanism, and when the rotating mechanism is rotated, the first housing and the second housing are rotated relative to each other, to drive the display screen to bend or unfold.

In this embodiment, the rotating mechanism is in an unfolded state, to drive the first housing and the second housing to be relatively unfolded, so that the foldable electronic device is in an unfolded state. When the rotating mechanism is in a folded state, the first housing and the second housing are relatively folded, so that the foldable electronic device is in a folded state.

In a possible implementation, the electronic device or the rotating mechanism further includes a locking member, the first synchronization swing arm is rotated through external force and is in an unfolded state or a folded state relative to the second synchronization swing arm, and the locking member fastens the first synchronization swing arm and the second synchronization swing arm.

In this embodiment, the foldable electronic device can be kept in a folded state or an unfolded state by disposing the locking member.

BRIEF DESCRIPTION OF THE DRAWINGS

To describe technical solutions in embodiments of this application or in the background more clearly, the following describes accompanying drawings that need to be used in embodiments of this application or the background.

DETAILED DESCRIPTION OF ILLUSTRATIVE EMBODIMENTS

The following describes embodiments of this application with reference to the accompanying drawings in embodiments of this application.

Figure 1:
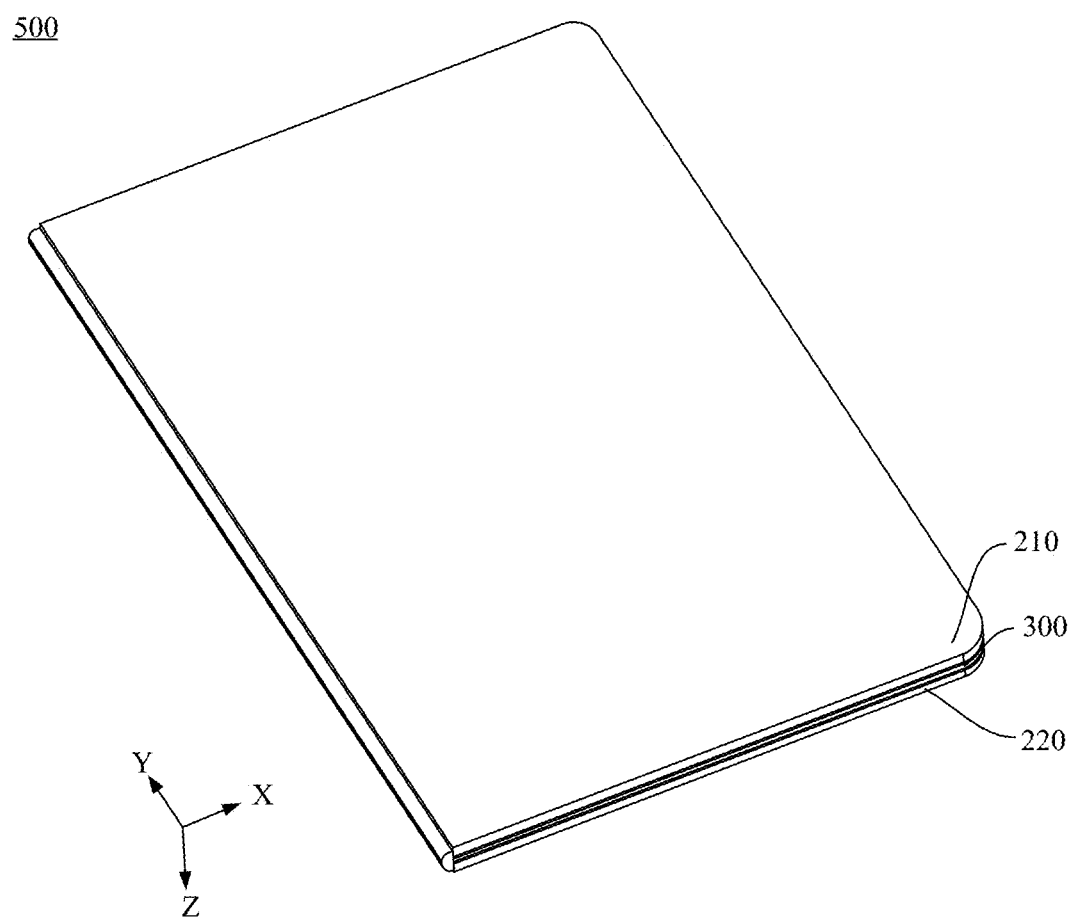
FIG. 1 is a schematic diagram of a structure of a foldable electronic device in a folded state according to an embodiment of this application.
Figure 2:
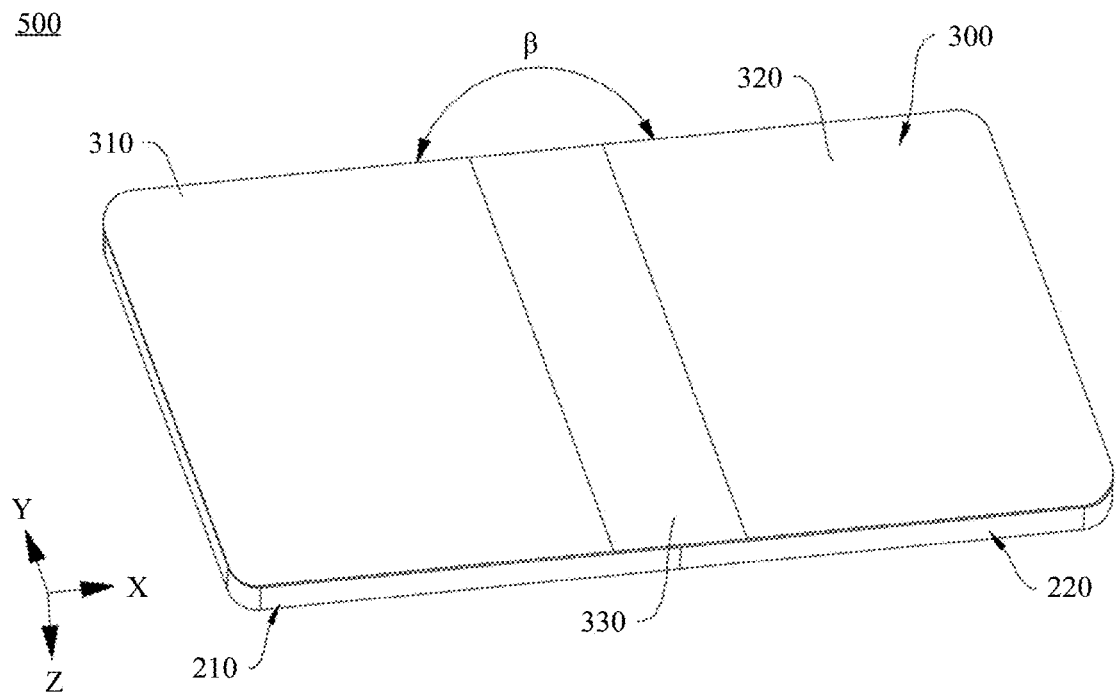
FIG. 2 is a schematic diagram of a structure of a foldable electronic device in a flattened state according to an embodiment of this application.

FIG. 1 is a schematic diagram of a structure of a foldable electronic device 500 in a folded state according to an embodiment of this application. FIG. 2 is a schematic diagram of a structure of a foldable electronic device 500 in a flattened state according to an embodiment of this application.

For ease of description, a width direction of the foldable electronic device 500 is defined as an X direction, a length direction of the foldable electronic device 500 is defined as a Y direction, and a thickness direction of the foldable electronic device 500 is defined as a Z direction. The X, Y and Z directions are perpendicular to each other.

The foldable electronic device 500 includes but is not limited to a mobile phone (cellphone), a notebook computer (notebook computer), a tablet computer (tablet personal computer), a laptop computer (laptop computer), a personal digital assistant (personal digital assistant), a wearable device (wearable device), or a vehicle-mounted device (mobile device). In this embodiment of this application, an example in which the foldable electronic device 500 is a mobile phone is used for description.

The foldable electronic device 500 shown in FIG. 1 is in a folded state and the foldable electronic device 500 shown in FIG. 2 is in a flattened state.

It should be noted that slight deviations are allowed for all angles described by using examples in this embodiment of this application. That an unfolding angle β of the foldable electronic device 500 shown in FIG. 2 is 180 degrees means that β may be 180 degrees, or may be approximately 180 degrees, for example, 170 degrees, 175 degrees, 185 degrees, or 190 degrees. Angles used as examples for description in the following can be understood identically.

Figure 3:
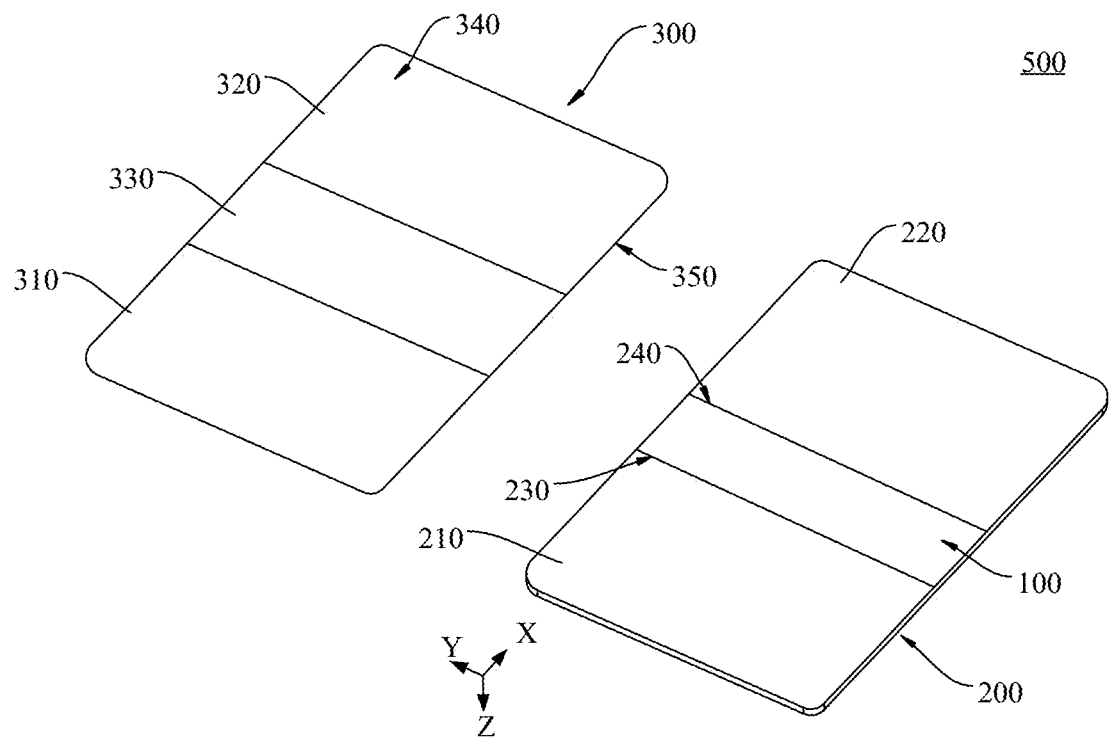
FIG. 3 is a schematic diagram of a partial exploded structure of the foldable electronic device shown in FIG. 2.

FIG. 3 is a schematic diagram of a partial exploded structure of the foldable electronic device 500 shown in FIG. 2.

The foldable electronic device 500 includes a folding apparatus 200 and a display screen 300, and the display screen 300 is mounted on the folding apparatus 200. The display screen 300 includes a display surface 340 and a mounting surface 350, and the display surface 340 and the mounting surface 350 are disposed opposite to each other. The display surface 340 is configured to display a text, an image, a video, and the like. The display screen 300 includes a first portion 310, a second portion 320, and a foldable portion 330. The foldable portion 330 is located between the first portion 310 and the second portion 320, and may be bent in the Y direction. The first portion 310, the second portion 320, and the foldable portion 330 jointly constitute the display screen 300. In this embodiment, the display screen 300 is a flexible display, for example, an organic light-emitting diode (organic light-emitting diode, OLED) display, an active-matrix organic light-emitting diode (active-matrix organic light-emitting diode, AMOLED) display, a mini light-emitting diode (mini organic light-emitting diode) display, a micro light-emitting diode (micro organic light-emitting diode) display, a micro organic light-emitting diode (micro organic light-emitting diode) display, or a quantum dot light-emitting diode (quantum dot light emitting diodes, QLED) display.

The folding apparatus 200 includes a first housing 210, a second housing 220, and a rotating mechanism 100. The first housing 210 is provided with a first mounting groove 230, the second housing 220 is provided with a second mounting groove 240, and the first mounting groove 230 communicates with the second mounting groove 240 to form a mounting groove. The rotating mechanism 100 is mounted in the mounting groove and is invariably connected to the first housing 210 and the second housing 220, so that the first housing 210 and the second housing 220 are rotatably connected to each other. The display screen 300 is mounted on the folding apparatus 200 and the mounting surface 350 is invariably connected to the folding apparatus 200. Specifically, the first housing 210 bears the first portion 310 of the display screen 300, and the second housing 220 bears the second portion 320. In other words, the first portion 310 is mounted on the first housing 210, and the second portion 320 is mounted on the second housing 220. The rotating mechanism 100 and the foldable portion 330 are disposed opposite to each other. The first housing 210 and the second housing 220 may be rotated relative to each other by using the rotating mechanism 100, so that the folding apparatus 200 switches between a folded state and a flattened state.

With reference to FIG. 1, the first housing 210 and the second housing 220 are rotated relative to each other by using the rotating mechanism 100, and the first housing 210 and the second housing 220 are relatively close to each other to drive the display screen 300 to fold, so that the foldable electronic device 500 is folded. When the foldable electronic device 500 is in a folded state, the foldable portion 330 of the display screen 300 is bent, and the first portion 310 and the second portion 320 are disposed opposite to each other. In this case, the display screen 300 is located between the first housing 210 and the second housing 220. This can greatly reduce a probability of damaging the display screen 300, and effectively protect the display screen 300.

The first housing 210 and the second housing 220 are relatively far away from each other to drive the display screen 300 to further unfold, until the foldable electronic device 500 is unfolded. The folding apparatus 200 is in a flattened state, an included angle between the first housing 210 and the second housing 220 is B, the foldable portion 330 is unfolded, and the first portion 310 and the second portion 320 are relatively unfolded. In this case, included angles between the first portion 310, the second portion 320, and the foldable portion 330 are all B, and the display screen 300 has a display region with a large area. This implements large-screen display of the foldable electronic device 500, thereby improving use experience of a user. In this embodiment, B is 180 degrees. In other embodiments, β may be alternatively approximately 180 degrees, for example, may be 170 degrees, 175 degrees, 185 degrees, or 190 degrees.

Figure 4:
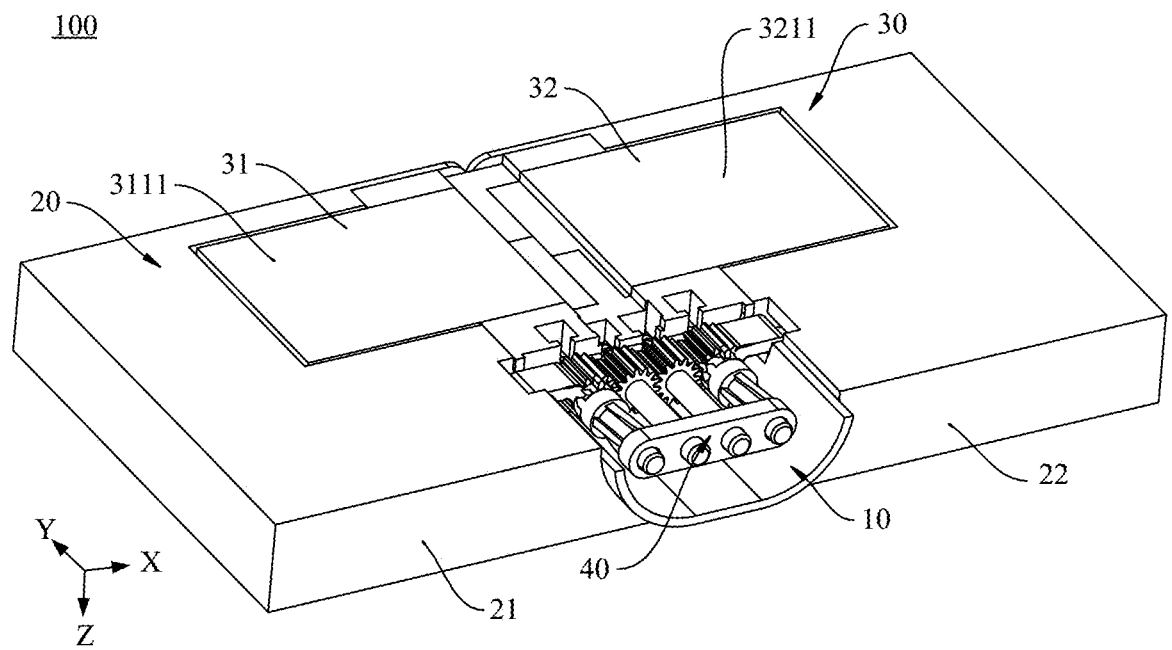
FIG. 4 is a schematic diagram of a partial structure of a rotating mechanism in the foldable electronic device shown in FIG. 3.
Figure 5:
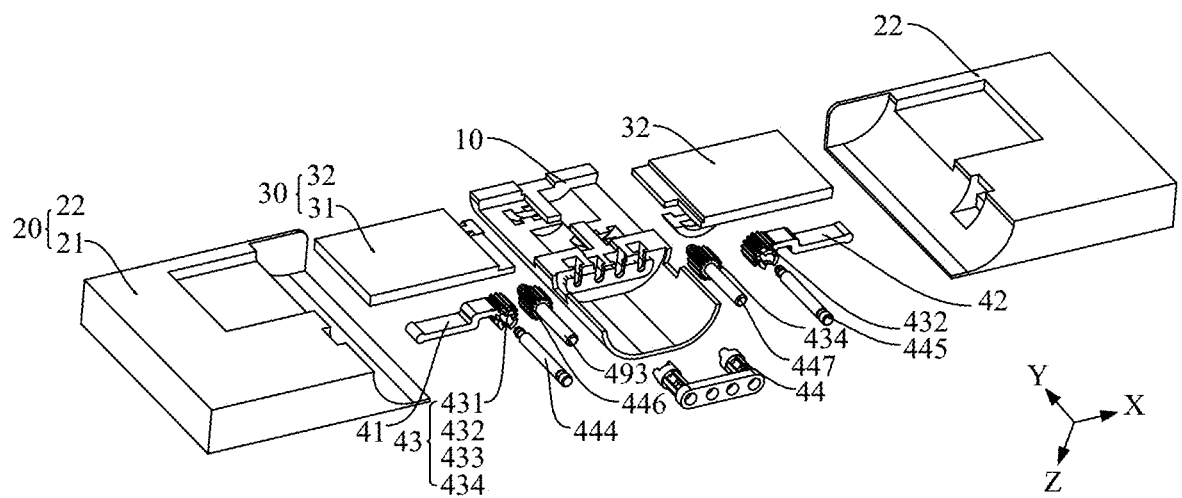
FIG. 5 is a schematic diagram of an exploded structure of the rotating mechanism shown in FIG. 4.

FIG. 4 is a schematic diagram of a partial structure of a rotating mechanism 100 in the foldable electronic device 500 shown in FIG. 3. FIG. 5 is a schematic diagram of an exploded structure of the rotating mechanism 100 shown in FIG. 4.

The rotating mechanism 100 includes a fastening base 10, a fastening plate 20, a main swing arm 30, and a synchronization assembly 40. The main swing arm 30 and the synchronization assembly 40 are spaced from each other along a length direction of the fastening base 10, and are rotatably connected to the fastening base 10. The fastening plate 20 is invariably connected to the main swing arm 30, and the fastening plate 20 is slidably connected to the synchronization assembly 40. The foldable portion 330 of the display screen 300 is disposed opposite to the main swing arm 30 and the fastening plate 20. When the fastening plate 20 is rotated relative to the fastening base 10, the main swing arm 30 and the synchronization assembly 40 are driven to rotate relative to the fastening base 10, so that the rotating mechanism 100 is rotated, and the display screen 300 is bent.

It should be noted that FIG. 4 and FIG. 5 show only a partial structure of the rotating mechanism 100 in a positive direction of a Y axis. The fastening plate 20, the main swing arm 30, and the synchronization assembly 40 are a group of substructures. The entire rotating mechanism 100 has at least two groups of the foregoing substructures, and the fastening base 10 is provided with one group of the foregoing substructures at each of two opposite ends in the Y direction. To be specific, one end of the fastening base 10 is provided with a fastening plate 20, a main swing arm 30, and a synchronization assembly 40, and the other end of the fastening base 10 is also provided with a fastening plate 20, a main swing arm 30, and a synchronization assembly 40. To improve stability of the entire rotating mechanism 100, one group of the foregoing substructures is added between the substructures at the two ends of the fastening base 10, and the substructures are located in the middle of the fastening base 10. To further improve the stability of the entire rotating mechanism 100, two groups of the foregoing substructures may be alternatively added between the substructures at the two ends of the fastening base 10. A quantity of the substructures may be adjusted depending on an actual situation. In an implementation, fastening plates 20 and bases 10 in two groups of the foregoing substructures may be integrally formed. To be specific, the main swing arms 30 and the synchronization assemblies 40 in the two groups of the foregoing substructures are connected to one fastening plate 20 and share one base 10.

In one group of the foregoing substructures, the fastening plate 20 includes a first fastening plate 21 and a second fastening plate 22. The main swing arm 30 includes a first main swing arm 31 and a second main swing arm 32. The first main swing arm 31 and the first fastening plate 21 are mounted on one side of the fastening base 10, and the second main swing arm 32 and the second fastening plate 22 are mounted on the other side of the fastening base 10. One end of the first main swing arm 31 is rotatably and slidably connected to the fastening base 10, and the other end of the first main swing arm 31 is invariably connected to the first fastening plate 21. When the first fastening plate 21 is rotated relative to the fastening base 10, the first main swing arm 31 is driven to rotate relative to the fastening base 10. One end of the second main swing arm 32 is rotatably and slidably connected to the fastening base 10, and the other end of the first main swing arm 31 is invariably connected to the second fastening plate 22. When the second fastening plate 22 is rotated relative to the fastening base 10, the second main swing arm 32 is driven to rotate relative to the fastening base 10.

Figure 6:
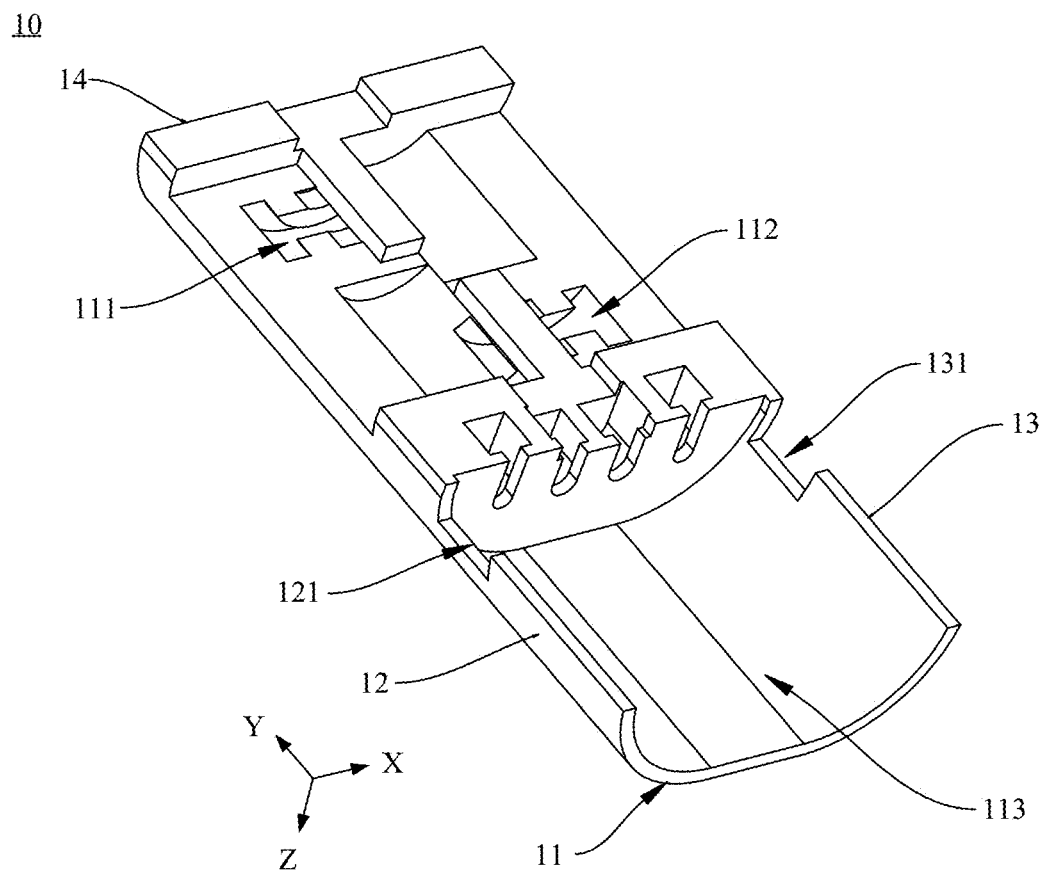
FIG. 6 is a schematic diagram of a partial structure of a fastening base in the rotating mechanism shown in FIG. 5.

FIG. 6 is a schematic diagram of a partial structure of a fastening base 10 in the rotating mechanism 100 shown in FIG. 5.

The fastening base 10 is elongated, and the length direction of the fastening base 10 is parallel to the Y direction. The fastening base 10 includes a bottom plate 11, a first side plate 12, a second side plate 13, a first end plate 14, and a second end plate (not shown in the figure). The first side plate 12 and the second side plate 13 are disposed opposite to each other, and the first side plate 12 and the second side plate 13 are respectively connected to two opposite sides of the bottom plate 11 in the X direction. The first end plate 14 and the second end plate are opposite to each other, and the first end plate 14 and the second end plate are both connected between the first side plate 12 and the second side plate 13 and are respectively connected to two opposite sides of the bottom plate 11 in the Y direction. In this embodiment, the first side plate 12 and the second side plate 13 are both arc-shaped, and the first side plate 12 and the second side plate 13 are bent in a direction in which the first side plate 12 and the second side plate 13 are close to each other. The first side plate 12 further includes a first side plate notch 121, and the first side plate notch 121 is disposed at an edge of the first side plate 12. The second side plate 13 further includes a second side plate notch 131, and the second side plate notch 131 is disposed at an edge of the second side plate 13. The first side plate notch 121 and the second side plate notch 131 are opposite to each other.

The bottom plate 11 is provided with a first rotating groove 111 and a second rotating groove 112. Bottom walls of the first rotating groove 111 and the second rotating groove 112 are both arc-shaped, and extension directions of the bottom walls of the first rotating groove 111 and the second rotating groove 112 are both parallel to the X direction. The first rotating groove 111 and the second rotating groove 112 are opposite to each other, and are spaced and are disposed opposite to each other in the Y direction. The first rotating groove 111 and the second rotating groove 112 are configured to mount the main swing arm 30, and the main swing arm 30 can slide and rotate in the first rotating groove 111 and the second rotating groove 112.

The fastening base 10 is further provided with an accommodation groove 113. The accommodation groove 113 is enclosed by the bottom plate 11, the first side plate 12, and the second side plate 13. The accommodation groove 113 is spaced from the first rotating groove 111 and the second rotating groove 112. The accommodation groove 113 is configured to mount the synchronization assembly 40.

It should be noted that FIG. 6 shows only a partial structure of the fastening base 10 in the positive direction of the Y axis, and a structure of the fastening base 10 in a negative direction of the Y axis and the structure of the fastening base 10 in the positive direction of the Y axis are an axisymmetric structure or a centrosymmetric structure.

Figure 7:
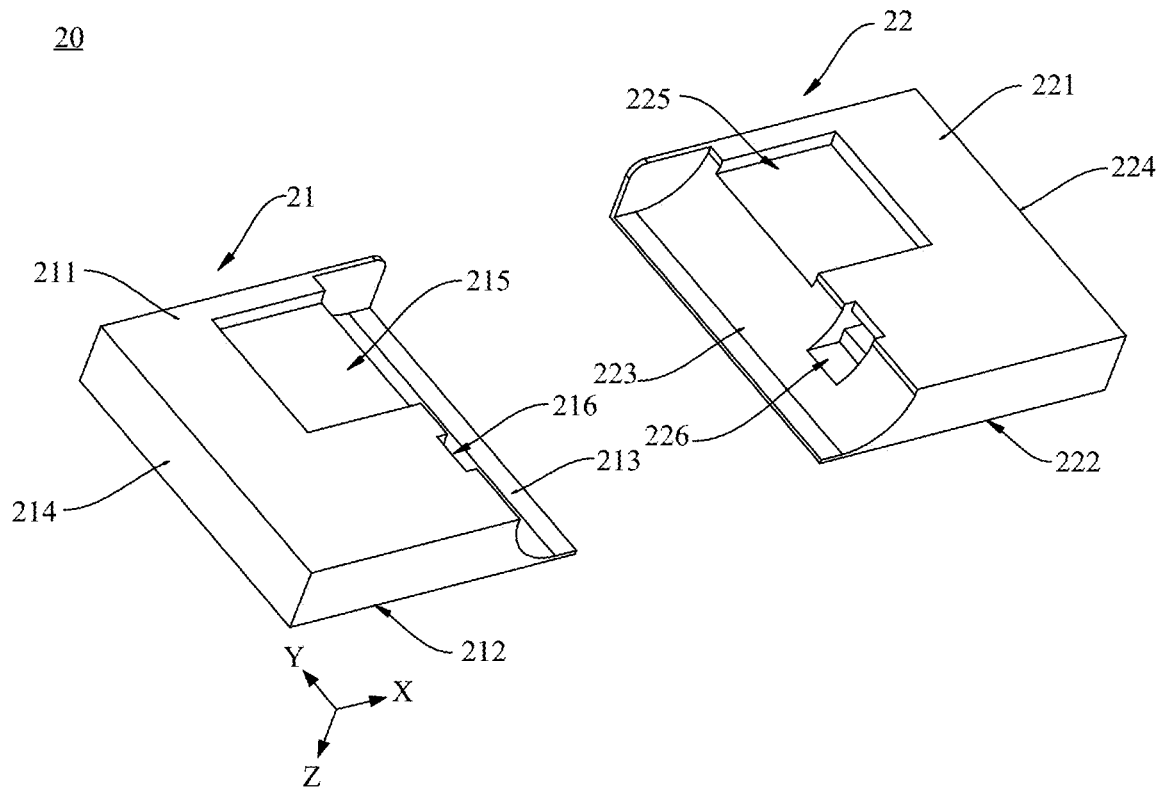
FIG. 7 is schematic diagrams of structures of a first fastening plate and a second fastening plate in the rotating mechanism shown in FIG. 5.

FIG. 7 is schematic diagrams of structures of a first fastening plate 21 and a second fastening plate 22 in the rotating mechanism 100 shown in FIG. 5.

The fastening plate 20 includes the first fastening plate 21 and the second fastening plate 22. The first fastening plate 21 is of a rectangular plate-like structure. The first fastening plate 21 includes a first surface 211, a second surface 212, a first side surface 213, and a second side surface 214. The first side surface 213 and the second side surface 214 are disposed opposite to each other, and both the first side surface 213 and the second side surface 214 are parallel to the Y direction. The first side surface 213 is an arc surface, and is configured to fit in with the first side plate 12 of the fastening base 10. The first surface 211 and the second surface 212 are disposed opposite to each other. Both the first surface 211 and the second surface 212 are connected between the first side surface 213 and the second side surface 214.

The first fastening plate 21 is provided with a first groove 215 and a first sliding slot 216. The first groove 215 is disposed by being recessed from the first surface 211 and penetrates through the first side surface 213. It can be understood that a groove with an arc-shaped interface is formed at a junction of the first surface 211 and the first side surface 213, the groove recesses the first fastening plate 21, and a length direction of the first groove 215 is the Y direction. The first groove 215 is configured to mount the main swing arm 30, so that the main swing arm 30 is invariably connected to the first fastening plate 21. The first sliding slot 216 is spaced from the first groove 215 and a length extension direction of the first sliding slot 216 is parallel to the X direction. An opening of the first sliding slot 216 is located at a groove bottom wall of the first groove 215 and the first surface 211. The first sliding slot 216 is configured to mount the synchronization assembly 40, so that the synchronization assembly 40 is slidably connected to the first fastening plate 21.

A structure of the second fastening plate 22 is the same as that of the first fastening plate 21. The second fastening plate 22 includes a third surface 221, a fourth surface 222, a third side surface 223, and a fourth side surface 224. The third side surface 223 and the fourth side surface 224 are disposed opposite to each other, and both are parallel to the Y direction. The third side surface 223 is an arc surface, and is configured to fit in with the second side plate 13 of the fastening base 10. The third surface 221 and the fourth surface 222 are disposed opposite to each other. The second fastening plate 22 is provided with a second groove 225 and a second sliding slot 226. A structure of the second groove 225 is the same as that of the first groove 215, and a structure of the second sliding slot 226 is the same as that of the first sliding slot 216. The second groove 225 is configured to mount the main swing arm 30, so that the main swing arm 30 is invariably connected to the second fastening plate 22. An opening of the second sliding slot 226 is located at a groove bottom wall of the second groove 225 and the third surface 221. The second sliding slot 226 is configured to mount the synchronization assembly 40, so that the synchronization assembly 40 is slidably connected to the second fastening plate 22.

Figure 8:
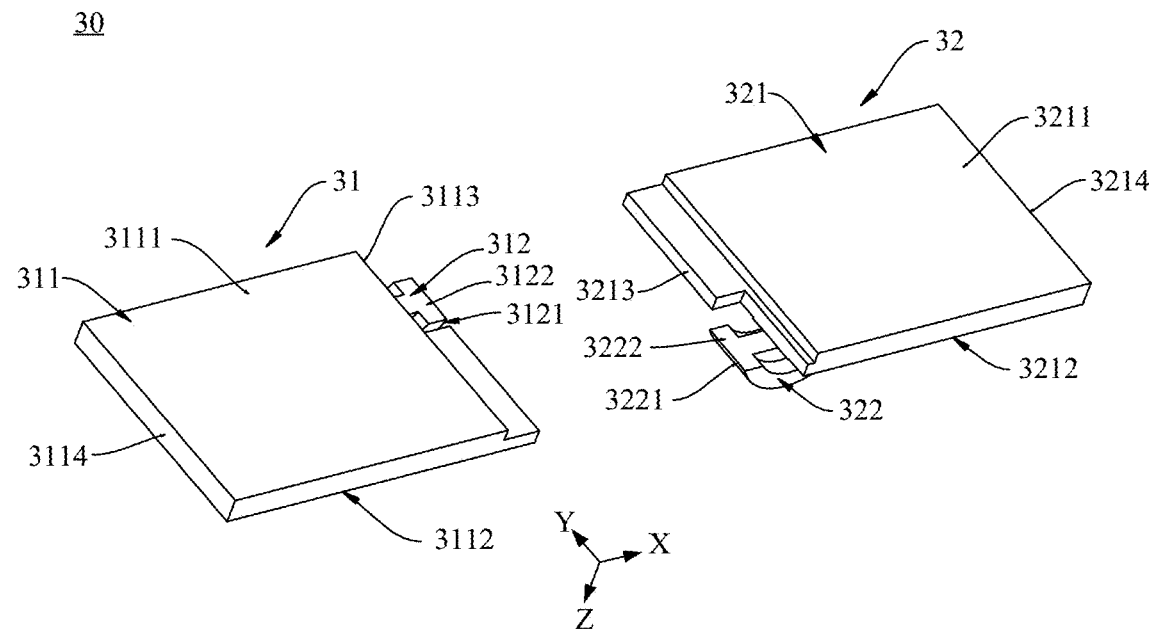
FIG. 8 is schematic diagrams of enlarged structures of a first main swing arm and a second main swing arm in the rotating mechanism shown in FIG. 5.

FIG. 8 is schematic diagrams of enlarged structures of a first main swing arm 31 and a second main swing arm 32 in the rotating mechanism 100 shown in FIG. 5.

The first main swing arm 31 includes a first swing body 311 and a first rotating body 312. In this embodiment, the first swing body 311 is of a rectangular plate-like structure. The first swing body 311 includes a first upper surface 3111, a first lower surface 3112, a first side face 3113, and a second side face 3114. The first upper surface 3111 and the first lower surface 3112 are both perpendicular to the Z direction, and the first upper surface 3111 and the first lower surface 3112 are disposed opposite to each other. In this embodiment, the first upper surface 3111 is a plane. The first side face 3113 and the second side face 3114 are both parallel to the Y direction, the first side face 3113 and the second side face 3114 are disposed opposite to each other, and the first side face 3113 and the second side face 3114 are both connected between the first upper surface 3111 and the first lower surface 3112.

The first rotating body 312 includes a first rotating surface 3121, the first rotating surface 3121 is arc-shaped, a bending direction of the first rotating surface 3121 faces the first upper surface 3111, and a bending radian of the first rotating surface 3121 is consistent with a bending radian of the bottom wall of the first rotating groove 111. Certainly, alternatively, a bending radian of the first rotating surface 3121 may be roughly the same as a bending radian of the bottom wall of the first rotating groove 111. The first rotating body 312 further includes a first free end 3122 and a first connecting end (not shown in the figure), and the first free end 3122 and the first connecting end are respectively located at two opposite ends in an extension direction of the first rotating surface 3121. The first connecting end is invariably connected to the first lower surface 3112, and the first free end 3122 is located on one side of the first side face 3113 and has a same orientation as the first upper surface 3111.

The second main swing arm 32 includes a second swing body 321 and a second rotating body 322. A structure of the second swing body 321 is the same as that of the first swing body 311. The second swing body 321 includes a second upper surface 3211, a second lower surface 3212, a third side face 3213, and a fourth side face 3214. A structure of the second rotating body 322 is the same as that of the first rotating body 312. The second rotating body 322 includes a second rotating surface 3221, a second free end 3222, and a second connecting end. A structure of the second rotating surface 3221 is the same as that of the first rotating surface 3121, and a bending radian of the second rotating surface 3221 is consistent with or is roughly the same as a bending radian of the bottom wall of the second rotating groove 112. The second connecting end is invariably connected to the second lower surface 3212, the second free end 3222 extends from the third side face 3213 towards a direction away from the second rotating body 322, and a bending direction of the second rotating surface 3221 faces the second upper surface 3211. A location of the second rotating body 322 is corresponding to a location of the second rotating groove 112.

The first fastening plate 21 and the first main swing arm 31 are located on one side of the fastening base 10 in the X direction, and the second fastening plate 22 and the second main swing arm 32 are located on the other side of the fastening base 10 in the X direction. The first sliding slot 216 is in relative communication with the first side plate notch 121, the first rotating body 312 of the first main swing arm 31 is located in the first rotating groove 111, the first rotating surface 3121 is in contact with the bottom wall of the first rotating groove 111, and the first rotating body 312 can slide and rotate in the first rotating groove 111. The first swing body 311 is mounted in the first groove 215 and is invariably connected to an inner wall of the first groove 215. The first fastening plate 21 is invariably connected to the first housing 210.

The second sliding slot 226 is in relative communication with the second side plate notch 131, the second rotating body 322 of the second main swing arm 32 is located in the second rotating groove 112, the second rotating surface 3221 is in contact with the bottom wall of the second rotating groove 112, and the second rotating body 322 can slide and rotate in the second rotating groove 112. The second swing body 321 is mounted in the second groove 225 and is invariably connected to an inner wall of the second groove 225. The second fastening plate 22 is invariably connected to the second housing 220. In this embodiment, the first main swing arm 31 and the second main swing arm 32 may be alternatively disposed opposite to each other side by side in the X direction. In other embodiments, the first main swing arm 31 and the second main swing arm 32 are disposed in a staggered manner in the Y direction.

Rotation of the first housing 210 relative to the fastening base 10 can drive the first fastening plate 21 to rotate relative to the fastening base 10, to drive the first main swing arm 31 to rotate relative to the fastening base 10, and enable the first rotating body 312 to rotate and slide in the first rotating groove 111. Rotation of the second housing 220 relative to the fastening base 10 can drive the second fastening plate 22 to rotate relative to the fastening base 10, to drive the second main swing arm 32 to rotate relative to the fastening base 10, and enable the second rotating body 322 to rotate and slide in the second rotating groove 112. Rotation directions of the first fastening plate 21 and the second fastening plate 22 are opposite, and rotation directions of the first main swing arm 31 and the second main swing arm 32 are opposite.

For example, when the rotating mechanism 100 switches from a flattened state to a folded state, the first fastening plate 21 and the first main swing arm 31 are rotated counterclockwise by $\omega 1$, and the second fastening plate 22 and the second main swing arm 32 are rotated clockwise by $\omega 2$. When the rotating mechanism 100 switches from a folded state to a flattened state, the first fastening plate 21 and the first main swing arm 31 are rotated clockwise by ω2, and the second fastening plate 22 and the second main swing arm 32 are rotated counterclockwise by ω1. Specifically, the first fastening plate 21 and the second fastening plate 22 rotate in a direction in which the first fastening plate 21 and the second fastening plate 22 are close to each other, the first fastening plate 21 drives the first main swing arm 31 to rotate counterclockwise by ω1, and the first rotating body 312 is rotated counterclockwise by ω1 in the first rotating groove 111; and the second fastening plate 22 drives the second main swing arm 32 to rotate clockwise by ω2, and the second rotating body 322 is rotated clockwise by ω2 in the second rotating groove 112, so that the rotating mechanism 100 is in the folded state. The first fastening plate 21 and the second fastening plate 22 rotate in a direction in which the first fastening plate 21 and the second fastening plate 22 are away from each other, the first fastening plate 21 drives the first main swing arm 31 to rotate clockwise by ω2, and the first rotating body 312 is rotated clockwise by ω2 in the first rotating groove 111; and the second fastening plate 22 drives the second main swing arm 32 to rotate counterclockwise by ω1, and the second rotating body 322 is rotated counterclockwise by ω1 in the second rotating groove 112, so that the rotating mechanism 100 is restored to the flattened state.

When the rotating mechanism 100 is in the flattened state, the first fastening plate 21 and the second fastening plate 22 are unfolded relative to the fastening base 10, and the first main swing arm 31 and the second main swing arm 32 are unfolded relative to the fastening base 10. The first upper surface 3111, the first surface 211, the second upper surface 3211, and the second surface 212 are approximately in a same plane, and jointly support the display screen 300, to ensure stability of the display screen 300 and enable the display screen 300 to perform display normally.

In this embodiment, the first fastening plate 21 and the second fastening plate 22 are disposed, the first fastening plate 21 is invariably connected to the first housing 210, and the second fastening plate 22 is invariably connected to the second housing 220, so that connection strength between the fastening plate 20 and the housings can be increased, and rotation stability of the foldable electronic device 500 is improved. In addition, the first main swing arm 31 and the second main swing arm 32 are disposed, so that the first fastening plate 21 and the second fastening plate 22 are rotated relative to the fastening base 10, to increase rotation stability of the rotating mechanism 100.

Figure 9:
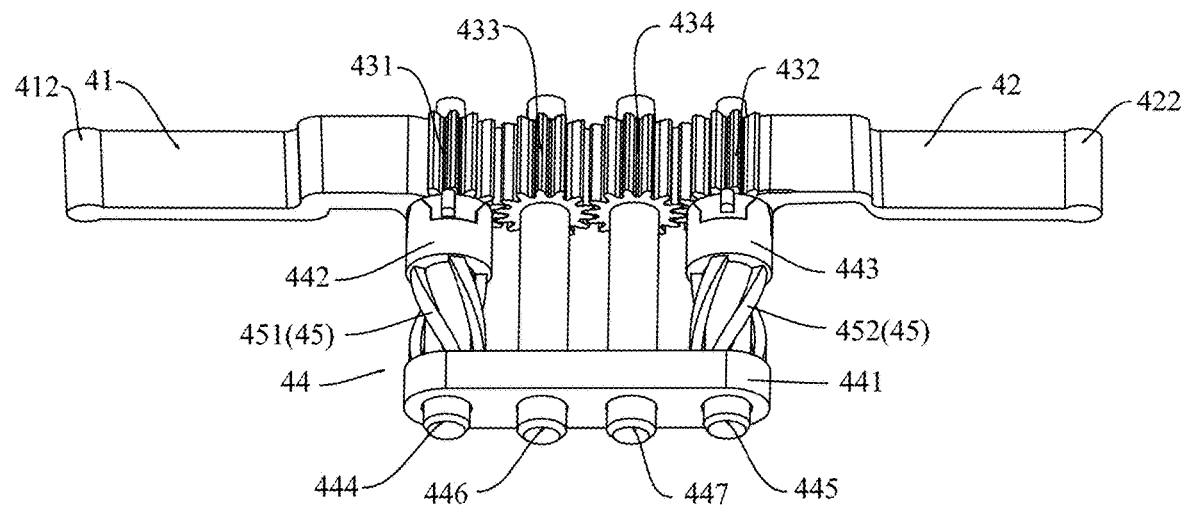
FIG. 9 is a schematic diagram of a structure of a synchronization assembly in the rotating mechanism shown in FIG. 4.
Figure 10:
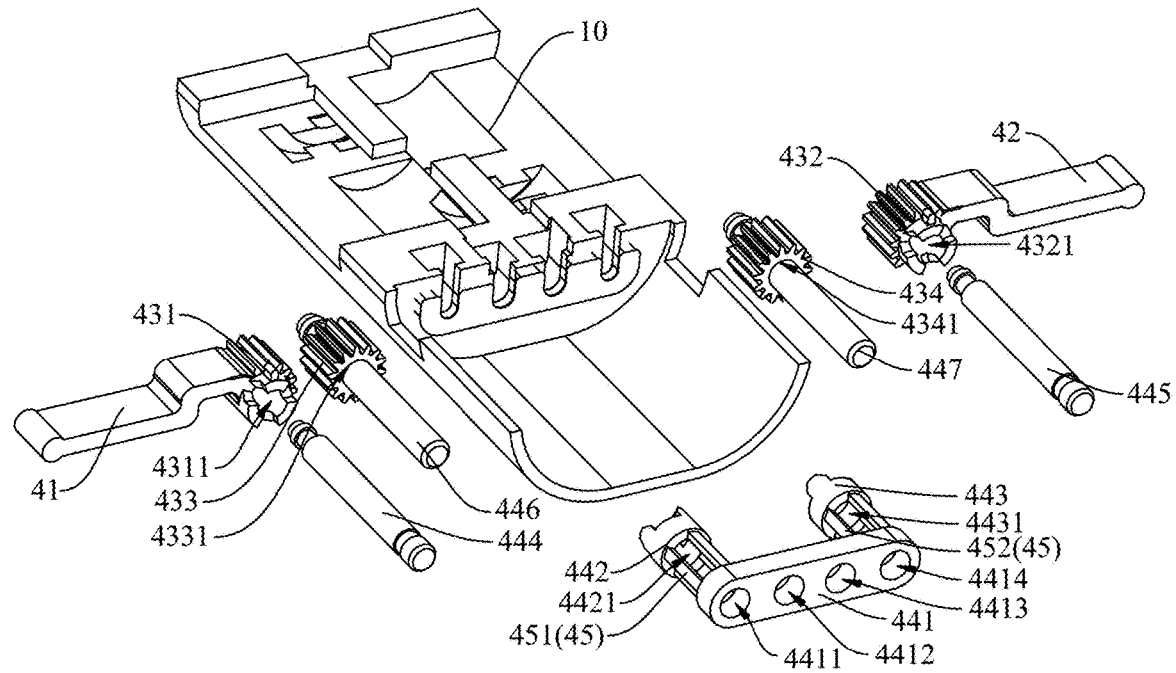
FIG. 10 is schematic diagrams of exploded structures of a fastening base and the synchronization assembly that is shown in FIG. 9.

FIG. 9 is a schematic diagram of a structure of a synchronization assembly 40 in the rotating mechanism 100 shown in FIG. 4. FIG. 10 is schematic diagrams of exploded structures of a fastening base and the synchronization assembly 40 that is shown in FIG. 9.

The synchronization assembly 40 includes a first synchronization swing arm 41, a second synchronization swing arm 42, a synchronization gear 43, connecting shafts, and a damping member 44. The synchronization gear 43 is mounted on the fastening base 10 through the connecting shafts, the first synchronization swing arm 41 and the second synchronization swing arm 42 are respectively connected to two opposite sides of the synchronization gear 43 in the X direction, the first synchronization swing arm 41 is slidably connected to the first fastening plate 21, and the second synchronization swing arm 42 is slidably connected to the second fastening plate 22. The damping member 44 is mounted on the fastening base 10, is located on a side face of the synchronization gear 43, and is invariably connected to the synchronization gear 43.

The synchronization gear 43 includes a first gear 431, intermediate gears, and a second gear 432. The intermediate gears include a third gear 433 and a fourth gear 434. All of the first gear 431, the second gear 432, the third gear 433, and the fourth gear 434 are of hollow structures. The first gear 431 is provided with a first through hole 4311, and the first through hole 4311 penetrates through the first gear 431 in an axial direction. The second gear 432 is provided with a second through hole 4321, and the second through hole 4321 penetrates through the second gear 432 in an axial direction. The third gear 433 is provided with a third through hole 4331, and the third through hole 4331 penetrates through the third gear 433 in an axial direction. The fourth gear 434 is provided with a fourth through hole 4341, and the fourth through hole 4341 penetrates through the fourth gear 434 in an axial direction.

The connecting shafts include a first connecting shaft 444, a second connecting shaft 445, a third connecting shaft 446, and a fourth connecting shaft 447.

The first gear 431, the third gear 433, the fourth gear 434, and the second gear 432 are sequentially disposed side by side, and two adjacent gears are engaged with each other. The first gear 431, the second gear 432, the third gear 433, and the fourth gear 434 are sequentially sleeved on the first connecting shaft 444, the second connecting shaft 445, the third connecting shaft 446, and the fourth connecting shaft 447. Rotation directions of the first gear 431 and the fourth gear 434 are the same, rotation directions of the third gear 433 and the second gear 432 are the same, and rotation directions of the first gear 431 and the second gear 432 are opposite. The synchronization gear 43 is mounted in the accommodation groove 113 of the fastening base 10, and an axial direction of the synchronization gear 43 is parallel to the Y direction.

Figure 11:
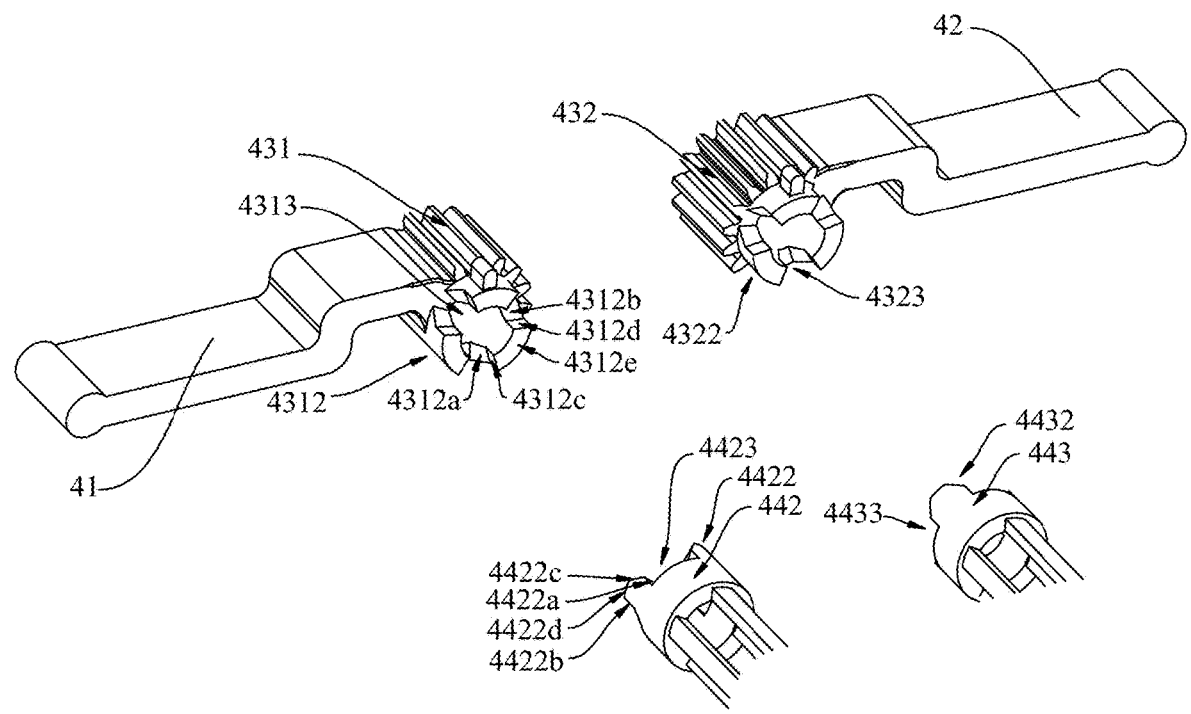
FIG. 11 is a partial schematic exploded diagram of a synchronization assembly according to an embodiment of this application.

FIG. 11 is a partial schematic exploded diagram of a synchronization assembly 40 according to an embodiment of this application. The first gear 431 may include a plurality of first protrusions 4312, and each first protrusion 4312 includes a first inclined surface 4312a, a second inclined surface 4312b, a fifth side face 4312c, a sixth side face 4312d, and a first plane 4312e. The first inclined surface 4312a and the second inclined surface 4312b are respectively connected to two opposite sides of the first plane 4312e, and the first inclined surface 4312a and the second inclined surface 4312b are disposed opposite to each other. The fifth side face 4312c is connected to the first inclined surface 4312a and the first plane 4312e, and the sixth side face 4312d is connected to the second inclined surface 4312b and the first plane 4312e. The fifth side face 4312c and the sixth side face 4312d are disposed opposite to each other, and the fifth side face 4312c and the sixth side face 4312d may be parallel to the axial direction of the first gear 431. Included angles between the fifth side face 4312c and the first plane 4312e and between the sixth side face 4312d and the first plane 4312e may be right angles, that is, the sixth side face 4312d and the fifth side face 4312c are perpendicular to the first plane 4312e. The plurality of first protrusions 4312 are all invariably connected to a side face of the first gear 431, and the plurality of first protrusions 4312 are arranged at intervals in a circumferential direction at a periphery of the first through hole 4311. The first gear 431 is further provided with first recess portions 4313. One first recess portion 4313 is disposed between two adjacent first protrusions 4312. In other words, the plurality of first protrusions 4312 and the plurality of first recess portions 4313 are alternately arranged in the circumferential direction at the periphery of the first through hole 4311.

The second gear 432 may include a plurality of second protrusions 4322, and a structure of the second protrusion 4322 is the same as that of the first protrusion 4312. The plurality of second protrusions 4322 are all invariably connected to a side face of the second gear 432, and the plurality of second protrusions 4322 are arranged at intervals in a circumferential direction at a periphery of the second through hole 4321. The second gear 432 is further provided with second recess portions 4323. One second recess portion 4323 is disposed between two adjacent second protrusions 4322, and a structure of the second recess portion 4323 is the same as that of the first recess portion 4313. In other words, the plurality of second protrusions 4322 and the plurality of second recess portions 4323 are alternately arranged in the circumferential direction at the periphery of the second through hole 4321. The second protrusions 4322 and the first protrusions 4312 are located on a same side of the synchronization gear 43.

The first synchronization swing arm 41 includes a first end 411 and a second end 412, and the first end 411 and the second end 412 are disposed opposite to each other. The first end 411 of the first synchronization swing arm 41 is invariably connected to the first gear 431, and the second end 412 is configured to slidably connect to the first fastening plate 21. The second synchronization swing arm 42 includes a third end 421 and a fourth end 422, and the third end 421 and the fourth end 422 are disposed opposite to each other. The third end 421 of the second synchronization swing arm 42 is invariably connected to the second gear 432, and the fourth end 422 is configured to slidably connect to the second fastening plate 22.

Figure 12:
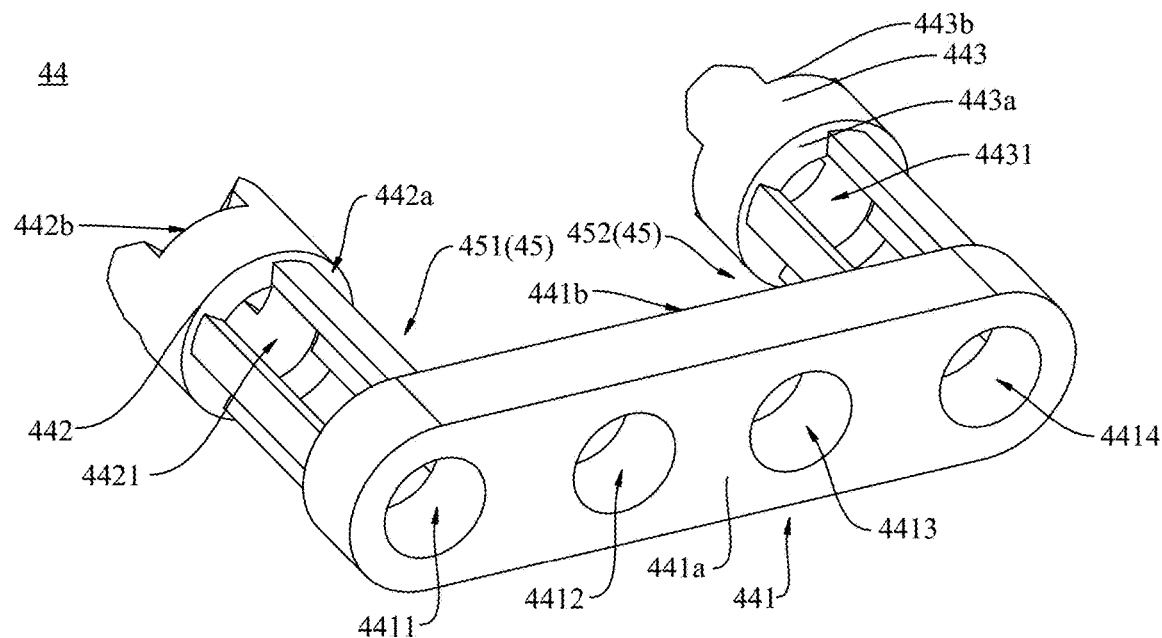
FIG. 12 is a schematic diagram of a partial structure of a damping body according to this application.

FIG. 12 is a schematic diagram of a partial structure of a damping body according to this application.

The damping member 44 includes a baffle plate 441, connecting seats, and a damping body 45. The connecting seats include a first connecting seat 442 and a second connecting seat 443. There may be two damping bodies 45: a first damping body 451 and a second damping body 452. One end of the first damping body 451 is connected to the first connecting seat 442, and the other end of the first damping body 451 is connected to the baffle plate 441. One end of the second damping body 452 is connected to the second connecting seat 443, and the other end of the second damping body 452 is connected to the baffle plate 441.

Specifically, the baffle plate 441 is of an elongated plate-like structure. The baffle plate 441 includes a first face 441a and a second face 441b. The first face 441a and the second face 441b are disposed opposite to each other. The baffle plate 441 is provided with a first mounting hole 4411, a second mounting hole 4412, a third mounting hole 4413, and a fourth mounting hole 4414. The first mounting hole 4411, the second mounting hole 4412, the third mounting hole 4413, and the fourth mounting hole 4414 are disposed at intervals along a length direction of the baffle plate 441, and penetrate through the first face 441a and the second face 441b.

The first connecting seat 442 is of a cylindrical structure, and includes a third face 442a and a fourth face 442b disposed opposite to each other. The first connecting seat 442 is provided with a fifth mounting hole 4421, and the fifth mounting hole 4421 penetrates through the third face 442a and the fourth face 442b. The second connecting seat 443 is also of a cylindrical structure, and includes a fifth face 443a and a sixth face 443b disposed opposite to each other. The second connecting seat 443 is provided with a sixth mounting hole 4431, and the sixth mounting hole 4431 penetrates through the fifth face 443a and the sixth face 443b. The fourth face 442b of the first connecting seat 442 is configured to connect to the first gear 431, the fifth mounting hole 4421 and the first mounting hole 4411 are opposite to each other, the first connecting shaft 444 can pass through the fifth mounting hole 4421 and the first mounting hole 4411, and the first damping body 451 is located on a side of an outer shaft of the first connecting shaft 444. The sixth face 443b of the second connecting seat 443 is configured to connect to the second gear 432, the sixth mounting hole 4431 and the fourth mounting hole 4414 are opposite to each other, the second connecting shaft 445 can pass through the sixth mounting hole 4431 and the fourth mounting hole 4414, and the second damping body 452 is located on a side of an outer shaft of the second connecting shaft 445.

The first connecting seat 442 further includes a plurality of third protrusions 4422, and the plurality of protrusions are disposed on the third face 442a of the first connecting seat 442. Each third protrusion 4422 includes a seventh side face 4422a and an eighth side face 4422b disposed opposite to each other, and a third inclined surface 4422c and a fourth inclined surface 4422d disposed opposite to each other. The seventh side face 4422a and the eighth side face 4422b may be connected perpendicularly to the third face 442a of the first connecting seat 442, and the seventh side face 4422a and the eighth side face 4422b may be parallel to an axial direction of the first connecting seat 442. The third inclined surface 4422c is connected to the seventh side face 4422a and the fourth inclined surface 4422d, an included angle between the third inclined surface 4422c and the seventh side face 4422a is an obtuse angle, and the third inclined surface 4422c and the fourth inclined surface 4422d are disposed at an included angle. The fourth inclined surface 4422d is connected to the third inclined surface 4422c and the eighth side face 4422b, and an included angle between the fourth inclined surface 4422d and a fourth plane is an obtuse angle. The plurality of third protrusions 4422 are all invariably connected to the third face 442a of the first connecting seat 442 and the plurality of first protrusions 4312 are arranged at intervals in a circumferential direction at a periphery of the fifth mounting hole 4421. One third recess portion 4423 is disposed between two adjacent third protrusions 4422. In other words, the plurality of third protrusions 4422 and the plurality of third recess portions 4423 are alternately arranged in the circumferential direction at a periphery of the first connecting seat 442.

The second connecting seat 443 has a same structure as the first connecting seat 442 and includes a plurality of fourth protrusions 4432, and a structure of the fourth protrusion 4432 is the same as that of the third protrusion 4422. The plurality of fourth protrusions 4432 are all connected to the fifth face 443a of the second connecting seat 443, and the plurality of fourth protrusions 4432 are arranged at intervals at a periphery of the sixth mounting hole 4431. The fourth protrusions 4432 and the third protrusions 4422 are located on a same side of the connecting seats. The second connecting seat 443 further includes fourth recess portions 4433. A structure of the fourth recess portion 4433 is the same as that of the third recess portion 4423. The plurality of fourth protrusions 4432 and the plurality of fourth recess portions 4433 are alternately arranged at a periphery of the second connecting seat 443.

Still with reference to FIG. 12, in an implementation of this application, the first damping body 451 may include a plurality of strip-shaped bodies, and is specifically made of a strip-shaped memory alloy material. In this embodiment, the first damping body 451 includes four strip-shaped bodies, one end of the four strip-shaped bodies is connected to a periphery of the first mounting hole 4411 of the second face 441b of the baffle plate 441, and the other end of the four strip-shaped bodies is connected to the periphery of the fifth mounting hole 4421 of the third face 442a of the first connecting seat 442. The four strip-shaped bodies are evenly distributed in an axial direction of the first mounting hole 4411 and the fifth mounting hole 4421. The second damping body 452 may include a plurality of strip-shaped bodies, and is specifically made of a strip-shaped memory alloy material. In this embodiment, the second damping body 452 includes four strip-shaped bodies, one end of the four strip-shaped bodies is connected to a periphery of the fourth mounting hole 4414 of the second face 441b of the baffle plate 441, and the other end of the four strip-shaped bodies is connected to the periphery of the sixth mounting hole 4431 of the fifth face 443a of the second connecting seat 443. The four strip-shaped bodies are evenly distributed in an axial direction of the fourth mounting hole 4414 and the sixth mounting hole 4431.

Figure 13:
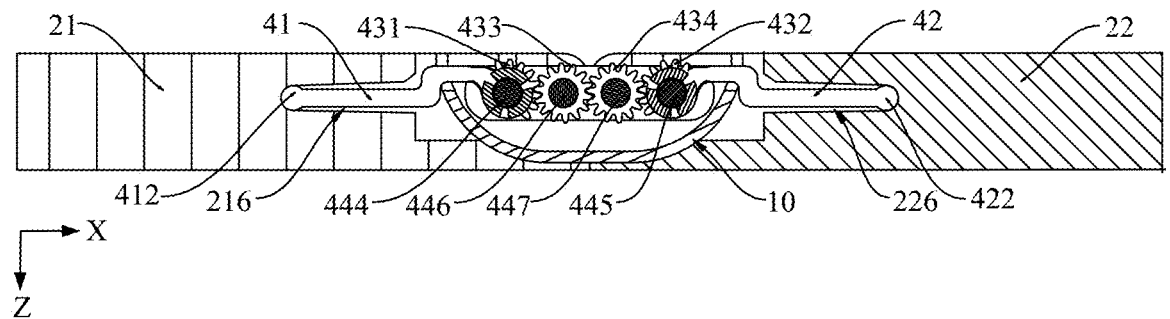
FIG. 13 is a schematic diagram of a cross-section of the rotating mechanism shown in FIG. 4.

Refer to FIG. 4 and FIG. 13. FIG. 13 is a schematic diagram of a cross-section of the rotating mechanism 100 shown in FIG. 4.

The synchronization assembly 40 is mounted on the fastening base 10. The synchronization gear 43 and the damping member 44 are arranged in the fastening base 10 along the Y direction. The first synchronization swing arm 41 and the second synchronization swing arm 42 are respectively located on two opposite sides of the fastening base 10 in the X direction. A part that is of the first synchronization swing arm 41 and that is provided with the second end 412 extends into the first sliding slot 216 of the first fastening plate 21, and is slidably and rotatably connected to the first fastening plate 21. A part that is of the second synchronization swing arm 42 and that is provided with the fourth end 422 extends into the second sliding slot 226 of the second fastening plate 22, and is slidably and rotatably connected to the second fastening plate 22.

The first connecting shaft 444, the second connecting shaft 445, the third connecting shaft 446, and the fourth connecting shaft 447 are all mounted on the fastening base 10. Length directions of the four connecting shafts are all parallel to the Y direction, and the four connecting shafts are disposed in parallel at intervals along the Y direction. End portions of the four connecting shafts are all invariably connected to the fastening base 10. The first connecting shaft 444 sequentially passes through the first gear 431, the first connecting seat 442, and the damping body 45. Specifically, the first connecting shaft 444 passes through the first through hole 4311, the fifth mounting hole 4421, the first damping body 451, and the first mounting hole 4411, and is invariably connected to the baffle plate 441. The first gear 431, the first connecting seat 442, and the first damping body 451 may be rotated relative to the first connecting shaft 444. The second connecting shaft 445 sequentially passes through the second gear 432, the second connecting seat 443, and the damping member 44. Specifically, the second connecting shaft 445 passes through the second through hole 4321, the sixth mounting hole 4431, the second damping body 452, and the fourth mounting hole 4414, and is invariably connected to the baffle plate 441. The second gear 432, the second connecting seat 443, and the second damping body 452 may be rotated relative to the second connecting shaft 445. The other end of the third connecting shaft 446 sequentially passes through the third through hole 4331 and the second mounting hole 4412, and is invariably connected to the baffle plate 441. The third gear may be rotated relative to the third connecting shaft 446. The other end of the fourth connecting shaft 447 sequentially passes through the fourth through hole 4341 and the fourth mounting hole 4414, and is invariably connected to the baffle plate 441. The fourth gear 434, the second connecting seat 443, and the second damping body 452 may be rotated relative to the fourth connecting shaft 447.

When the first fastening plate 21 is rotated relative to the fastening base 10, the first synchronization swing arm 41 is driven to rotate, and the first synchronization swing arm 41 slides and rotates in the first sliding slot 216. When the first synchronization swing arm 41 is rotated, the first gear 431 is driven to synchronously rotate, the second gear 432 is driven to rotate through the third gear 433 and the fourth gear 434, the second synchronization swing arm 42 is driven to rotate, the second fastening plate 22 is driven to rotate, and the second synchronization swing arm 42 slides and rotates in the second sliding slot 226. In this way, the first synchronization swing arm 41 and the second synchronization swing arm 42 are synchronously rotated, and the first fastening plate 21 and the second fastening plate 22 are synchronously rotated.

It should be noted that, when the first gear 431 is rotated, the first connecting seat 442 is driven to rotate. When the first connecting seat 442 is rotated, one end that is of the first damping body 451 and that is connected to the first connecting seat 442 is driven to rotate, so that the first damping body 451 is deformed and generates damping force, thereby implementing damping effect. The rotation of the first gear 431 can drive the fourth gear 434 to rotate, to drive the second connecting seat 443 to rotate in an opposite direction to the first connecting seat 442. When the second connecting seat 443 rotates, one end that is of the second damping body 452 and that is connected to the second connecting seat 443 is driven to rotate, so that the second damping body 452 is deformed and generates damping force, thereby implementing damping effect. Moreover, the damping force generated by the first damping body 451 and the second damping body 452 through deformation enables the rotating mechanism 100 to hover at any angle.

Specifically, the first gear 431 is invariably connected to the first connecting seat 442, the first connecting seat 442 is sleeved on the first connecting shaft 444, the first protrusions 4312 are connected to the third recess portions 4423, and the third protrusions 4422 are connected to the first recess portions 4313. In other words, shapes of the first protrusions 4312 match shapes of the third recess portions 4423, the first protrusions 4312 can be exactly clamped to the third recess portions 4423, and likewise the third protrusions 4422 can be exactly clamped to the first recess portions 4313. To be specific, a fifth side face 4312c of a first protrusion 4312 is butted with a seventh side face 4422a of one third protrusion 4422, a first inclined surface 4312a is butted with a third inclined surface 4422c, and a sixth side face 4312d and a second inclined surface 4312b are respectively butted with an eighth side face 4422b and a fourth inclined surface 4422d of another third protrusion 4422. When the first synchronization swing arm 41 is rotated, the first gear 431 can be driven to rotate, to drive the first connecting seat 442 to synchronously rotate. The first gear 431 and the first connecting seat 442 can be invariably connected to each other directly by using colloid. In one manner, the first gear 431 and the first connecting seat 442 are invariably connected to each other directly through a flat end.

The second gear 432 is invariably connected to the second connecting seat 443 in a same manner as the manner in which the first gear 431 is connected to the first connecting seat 442. The second protrusions 4322 are connected to the fourth recess portions 4433 and are adjacent to the fourth protrusions 4432, and the fourth protrusions 4432 are connected to the second recess portions 4323. In other words, shapes of the second protrusions 4322 match shapes of the fourth recess portions 4433, the second protrusions 4322 can be exactly clamped to the fourth recess portions 4433, and likewise the fourth protrusions 4432 can be exactly clamped to the second recess portions 4323. When the second synchronization swing arm 42 is rotated, the second gear 432 can be driven to rotate, to drive the second connecting seat 443 to synchronously rotate.

With development of science and technology, electronic devices (such as a mobile phone and a tablet computer) have developed from bar-type devices into foldable devices in terms of appearances (ID) and shapes. The foldable devices have large screens in unfolded states, fully satisfying visual experience of consumers. The foldable devices are small in volume and convenient to carry in folded states. Most of rotating mechanisms in the conventional technology use mechanical force of springs to provide damping force, to improve damping hand feeling when users use the rotating mechanisms. However, the rotating mechanisms generally include a large quantity of parts, and the parts have high machining precision requirements. This increases weights of terminal products and manufacturing costs of the parts, and also increases assembly difficulty of the parts. In addition, an assembly process between some parts cannot be automated at present. As a result, consistency and precision of the products are decreased. Because the rotating mechanisms include many parts and have complex structures, weights and needed mounting space of the rotating mechanisms are increased. This also causes difficulty to thinning and lightness of the terminal mechanisms.

In this application, the first synchronization swing arm 41 and the second synchronization swing arm 42 are respectively mounted on the two opposite sides of the fastening base in the width direction and are rotatably connected to the fastening base 10. One end of the damping body 45 is connected to the first synchronization swing arm 41, the other end of the damping body 45 is connected to the baffle plate 441, two opposite ends of the damping body 45 are disposed along the length direction of the fastening base 10, and the damping body 45 is made of a shape memory alloy. When the first synchronization swing arm 41 and the second synchronization swing arm 42 are in a folded state, the damping body 45 is in a first state, where the first state is an initial state of the damping body 45. The first synchronization swing arm 41 is rotated relative to the fastening base 10 to drive one end of the damping body 45 to rotate, the first synchronization swing arm 41 and the second synchronization swing arm 42 are relatively unfolded from the folded state, and the damping body 45 is in a second state, where the second state is that the damping body 45 is deformed and generates damping force relative to the first synchronization swing arm 41.

It can be understood that the first synchronization swing arm 41 and the second synchronization swing arm 42 can be rotated relative to each other under the action of external force exerted on the rotating mechanism. When the first synchronization swing arm 41 is rotated, one end of the damping body 45 is driven to rotate relative to the fastening base 10. One end that is of the damping body 45 and that is connected to the baffle plate 441 remains stationary relative to the fastening base 10. The damping body 45 is deformed when the first synchronization swing arm 41 is rotated. Because the damping body 45 is made of a shape memory alloy, the damping body 45 can generate damping force during deformation. When the damping body 45 is in the first state, the first synchronization swing arm 41 and the second synchronization swing arm 42 are relatively folded, and the rotating mechanism is in a folded state. In a process in which the rotating mechanism is relatively unfolded from the folded state, the first synchronization swing arm 41 is rotated to exert external force on the damping body 45, the damping body 45 is deformed from the first state to the second state, and the damping body 45 generates damping force resisting the external force during deformation under stress, to provide damping hand feeling.

In this application, the shape memory alloy is used as the damping body 45 of the terminal mechanism to implement hovering of the foldable electronic device at a folding angle, a flattening angle, or another unfolding angle, thereby improving use experience of the user. In addition, a structure and an assembly method of the rotating mechanism 100 can be further simplified, so that precision of the product is improved and costs of the terminal product are decreased.

Figure 14A:
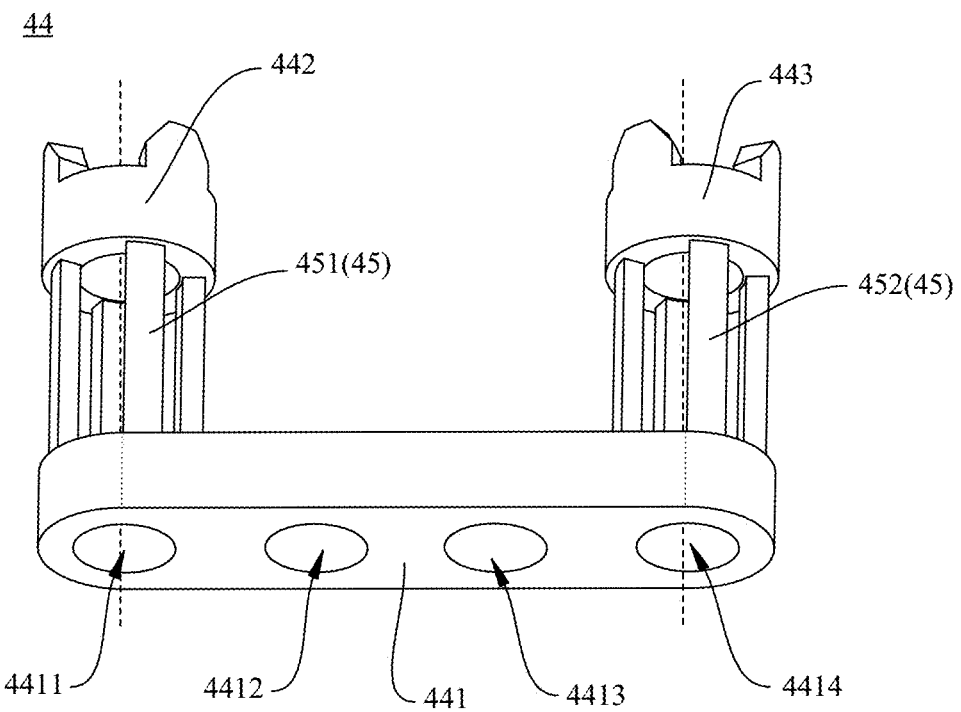
FIG. 14A is a schematic diagram of a structure of the damping member shown in FIG. 12 with damping bodies in a first state (an initial state)
Figure 14B:
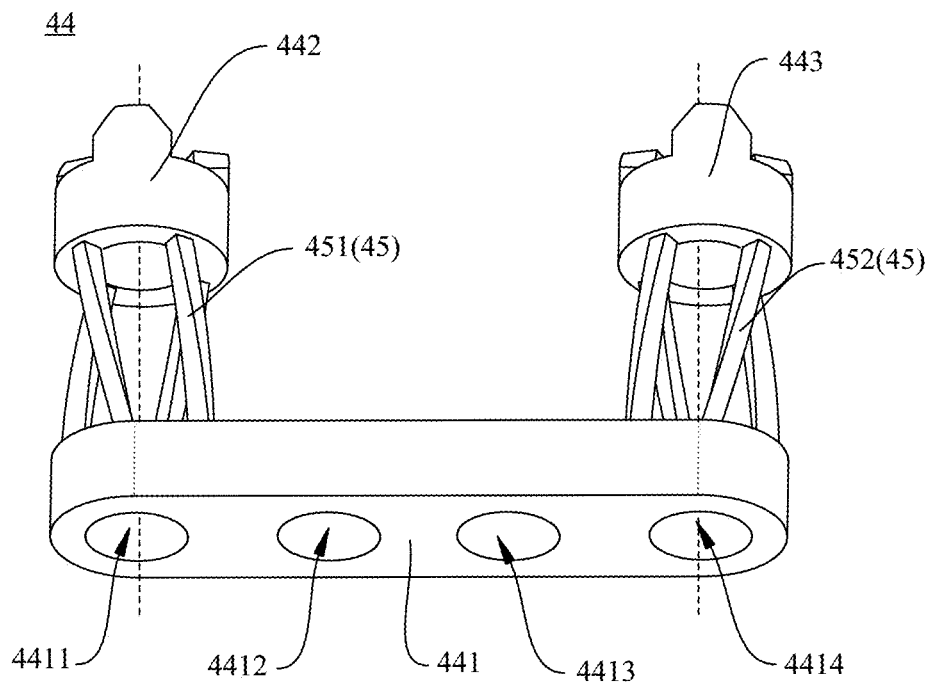
FIG. 14B is a schematic diagram of a structure of the damping member shown in FIG. 12 with damping bodies in a second state.
Figure 14C:
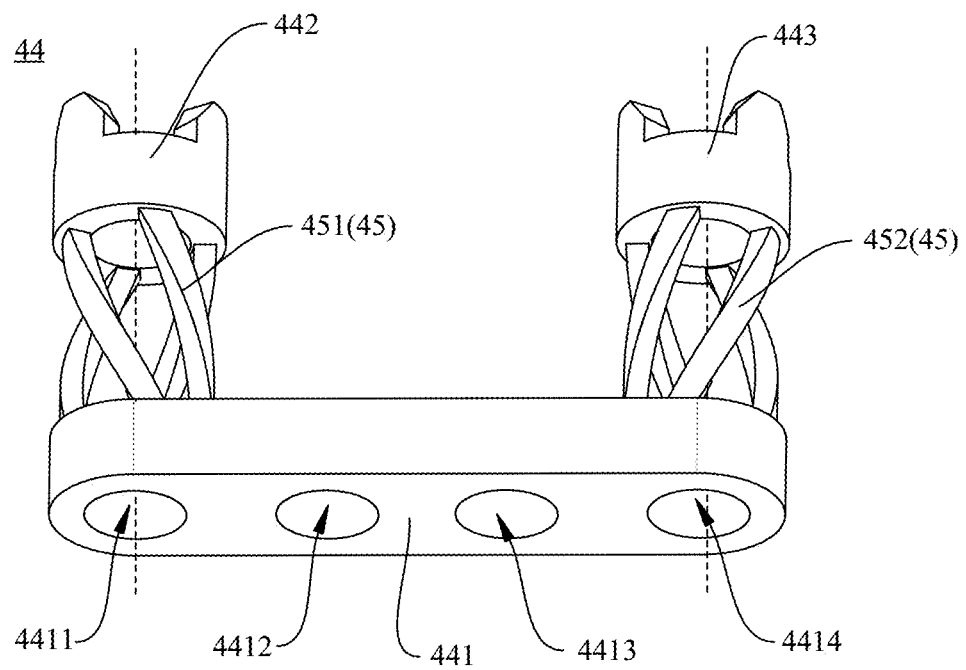
FIG. 14C is a schematic diagram of a structure of the damping member shown in FIG. 12 with damping bodies in a third state.
Figure 15:
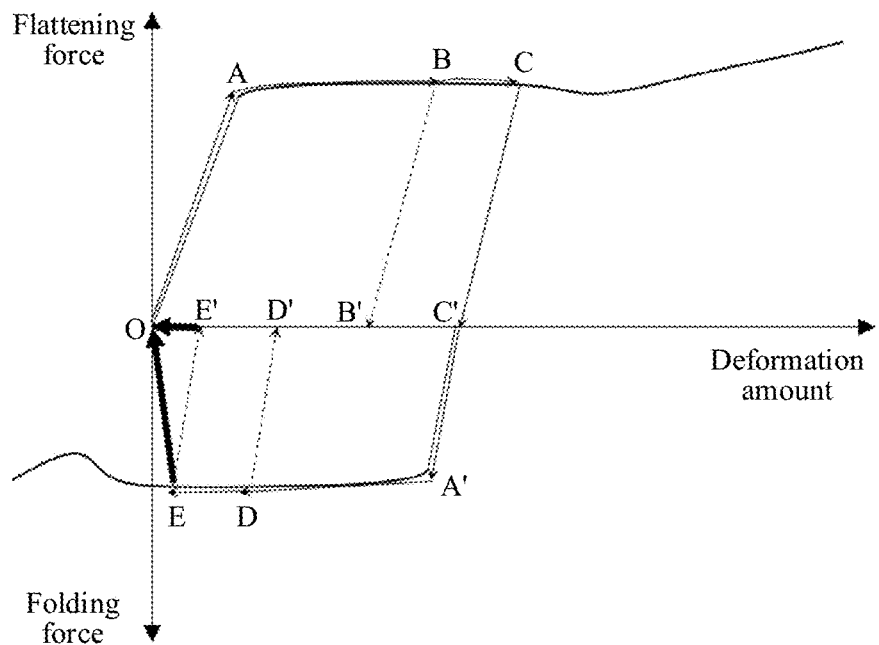
FIG. 15 is a line graph showing a relationship between deformation and external force in a first embodiment of a damping body according to an embodiment of this application.

FIG. 14A is a schematic diagram of a structure of the damping member 44 shown in FIG. 12 with the damping body 45 in a first state (an initial state). FIG. 14B is a schematic diagram of a structure of the damping member 44 shown in FIG. 12 with the damping body 45 in a second state. FIG. 14C is a schematic diagram of a structure of the damping member 44 shown in FIG. 12 with the damping body 45 in a third state. FIG. 15 is a line graph showing a relationship between deformation and external force in a first embodiment of the damping body 45 according to an embodiment of this application.

In a specific embodiment, the damping body 45 includes a plurality of independent strip-shaped bodies made of a shape memory alloy. As shown in FIG. 14A, in this embodiment, the damping body 45 is in the first state. The first state of the damping body 45 is the initial state, the damping body 45 is in a stable shape, and the stable shape in the first state may be a stable shape obtained through training. It should be understood that the damping body 45 is made of a shape memory alloy material, and a microstructure of the shape memory alloy in the first state may be austenite or a combination of austenite and martensite. In this embodiment, the damping body 45 is in the first state, and the rotating mechanism 100 is in a folded state. As shown in FIG. 15, a point O is a deformation amount when the rotating mechanism 100 is in a folded state and the damping body 45 is in the first state (the deformation amount in this embodiment is o).

That the rotating mechanism 100 is in a folded state means that the first fastening plate 21 and the second fastening plate 22 are rotated relative to the base 10 and are close to each other. For details, refer to the foregoing descriptions of the structure of the rotating mechanism 100 and subsequent descriptions of the damping body 45 and the folded state of the rotating mechanism 100. It can also be understood that if the rotating mechanism 100 is in a folded state, the corresponding damping body 45 is in a natural state. In this case, the damping body can keep the first synchronization swing arm 41 and the second synchronization swing arm 42 in a folded state. When the rotating mechanism 100 is in a folded state, the foldable electronic apparatus having the rotating mechanism 100 is in a folded state.

The damping body 45 in FIG. 14B is in the second state. Deformation occurs and specific damping force is generated in the second state, so that the rotating mechanism 100 is unfolded from the folded state when being exerted by external force. Specifically, the damping body 45 first undergoes elastic deformation under the action of external force, that is, the strip-shaped bodies undergo elastic deformation. With continuous external force, the deformation amount of the damping body 45 continuously increases. When the external force reaches a specific value, the damping body 45 reaches a yield stress, namely, a point A in FIG. 15. With continuous external force, the damping body 45 undergoes inelastic deformation and is located between points A and B in FIG. 15, that is, reaches the second state. During deformation, the damping body has damping force. As shown in FIG. 14B, shapes of the strip-shaped bodies are twisted in this case, that is, the damping body 45 is twisted along an outer edge of a circumferential surface of the first connecting shaft 444, and deformation amounts of the plurality of strip-shaped bodies are the same or approximately the same. The damping body 45 is deformed and the microstructure can also change, and the austenite in the first state can change to martensite.

Correspondingly, the rotating mechanism 100 is unfolded from the folded state, and the first synchronization swing arm 41 and the second synchronization swing arm 42 are relatively unfolded at an angle that may be greater than an angle at which the rotating mechanism 100 is in a folded state and less than an angle at which the rotating mechanism 100 is in a flattened state (the flattened state means a fully flattened state). In this embodiment, the damping body 45 is in the second state; and assuming that the rotating mechanism 100 is unfolded to 90 degrees (a tolerance range is allowed), an angle between the first fastening plate 21 and the second fastening plate 22 is 90 degrees. The damping force of the damping body 45 enables the rotating mechanism 100 (between the first synchronization swing arm 41 and the second synchronization swing arm 42, and also between the first fastening plate 21 and the second fastening plate 22) to have damping hand feel and hovering (the first fastening plate 21 and the second fastening plate 22 are positioned at an angle of 90 degrees between each other) performance, so that the electronic device using the rotating mechanism has damping hand feel and hovering performance.

If the external force is removed in this case, the deformation amount of the damping body 45 slightly decreases, and then the damping body 45 keeps in a stable shape. At a point B' in FIG. 15, in this case, the shape of the damping body 45 does not change any longer, and the corresponding rotating mechanism 100 remains in a stable hovering state. In other words, the first fastening plate 21 and the second fastening plate 22 relatively stop, and an angle between the first fastening plate 21 and the second fastening plate 22 in this case is less than 90 degrees (including a tolerance range). An angle of the rotating mechanism 100 may be fastened, to implement hovering of the rotating mechanism 100 (the foldable electronic device 500) at any angle at which the rotating mechanism 100 is not fully unfolded. It can be understood that when the angle between the first fastening plate 21 and the second fastening plate 22 are slightly rotated (a range larger than a tolerance) by more than 90 degrees under the action of external force, the damping body 45 is deformed to reach the point B. If the external force is removed, the deformation amount of the damping body 45 slightly decreases to the point B', and then the damping body 45 keeps in a stable shape. The angle between the first fastening plate 21 and the second fastening plate 22 in this case may be 90 degrees.

The damping body 45 in FIG. 14C is in the third state. The rotating mechanism 100 is in a fully flattened state, that is, is fully unfolded, and the damping body 45 is in the third state. As shown in FIG. 14C, the deformation amounts of the strip-shaped bodies of the damping body 45 are maximum. The deformation amount of the damping body 45 is a point C shown in FIG. 15. The damping body 45 in this case has a maximum deformation amount and maximum damping force. If the external force is removed in this case, the deformation amount of the damping body 45 slightly decreases, to reach a point C' shown in FIG. 15. In this case, the rotating mechanism remains in a stable hovering state, that is, the rotating mechanism is in a general flattened state. The first fastening plate 21 and the second fastening plate 22 are unfolded at an angle of approximately 180 degrees relative to the base 10, and a specific range of the unfolding angle may be between 160 degrees and 180 degrees. It can be understood that a process in which the second state changes to the third state is a process in which the deformation amount of the damping body increases and the damping force increases. In this process, the damping force always exists, and effect of providing damping hand feeling is achieved. In other words, a function of continuously providing damping hand feeling is achieved, and hovering can be implemented at any angle.

When the rotating mechanism 100 is restored to the folded state from the flattened state, the deformation amount of the damping body 45 changes from a deformed state (the third state) shown in FIG. 14C to the initial state (the first state) shown in FIG. 14A. In a folding process, with reference to FIG. 15, starting from a point A' in the figure, the damping body 45 is deformed when being exerted by external force. With reference to a point D and a point D' in FIG. 15, the deformation amount of the damping body 45 decreases from the unfolded state to the folded state. After the external force is removed, the deformation amount of the damping body 45 slightly increases and then keeps stable, and the rotating mechanism 100 remains in a stable hovering state in this case. In other words, the shape of the damping body 45 after the external force is removed tends to be restored to the shape when no external force is exerted.

If external force continues to be exerted to fold the rotating mechanism 100, the deformation amount of the damping body 45 continues to decrease. As shown at a point E in FIG. 15, the rotating mechanism 100 is actually in a general folded state in this case. If the external force is removed, in this case, the deformation amount of the shape memory alloy slightly increases, the damping body 45 is in a second intermediate state, and the rotating mechanism 100 is slightly unfolded and then hovers. As shown at a point E' in FIG. 15, a difference in deformation amounts between the point E and the point E' is equal to an angle at which the rotating mechanism 100 is slightly unfolded.

It should be noted that the rotating mechanism 100 includes a general folded state and a fully folded state (which may also be referred to as folded states) (but a tolerance range is allowed for both states); and the rotating mechanism 100 includes a general flattened state and a fully flattened state (which may also be referred to as flattened states) (but a tolerance range is allowed for both states).

In a possible implementation, as shown from the points E to E' to the point O in FIG. 15, the point E indicates that the rotating mechanism 100 is in a general folded state, and in this case, it indicates that the foldable electronic device 500 is close to a state in which a folding action is completed. The point E to the point E' in FIG. 15 indicate that when external force is removed at the point E, the strip-shaped bodies have residual stresses. After the residual stresses are released, the deformation amount of the damping body slightly increases and then keeps stable. The point E' indicates the deformation amount of the damping body 45 in this case, and the strip-shaped bodies have a slight deformation amount in this case. Then, a second preset temperature is applied to the strip-shaped bodies, to enable the strip-shaped bodies to be restored to the initial state, that is, the point O in the figure. The second preset temperature is a temperature applied when a stable shape is trained for the shape memory alloy. In this embodiment, stable shapes of the strip-shaped bodies of the damping body 45 are the initial state. The strip-shaped bodies of the damping body 45 can be restored to the initial state and keep in stable shapes under the action of the second preset temperature, so that the rotating mechanism 100 can be in a fully folded state and keep in a folded state, and the damping body 45 is restored to the state in FIG. 14A.

In another possible implementation, as shown from the point E to the point O in FIG. 15, external force may be exerted on the foldable electronic device 500, until the foldable electronic device 500 reaches a folded state. The rotating mechanism 100 is in a fully folded state when the external force is not removed, and a second preset temperature is applied to the shape memory alloy in this case. The shape memory alloy can be restored to the initial state and keep in a stable shape under the action of the second preset temperature, so that the foldable electronic device 500 keeps in a stable folded state.

Figure 16:
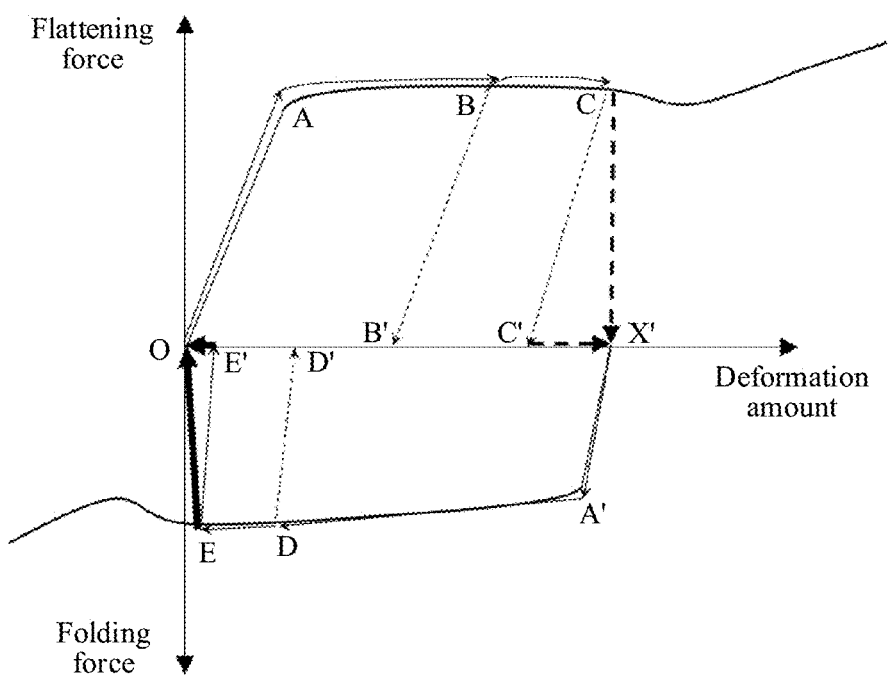
FIG. 16 is a line graph showing a relationship between deformation and external force in a second embodiment of a damping body according to an embodiment of this application.

For a second embodiment, refer to FIG. 16. FIG. 16 is a line graph showing a relationship between deformation and external force in the second embodiment of the damping body 45 according to an embodiment of this application. A difference from the first embodiment lies in that the damping body 45 may have two stable shapes. When the microstructure of the damping body 45 is in a stable shape, the damping body 45 appears in a stable shape macroscopically. In the two stable shapes of the damping body 45, a first stable shape is the foregoing initial state (the first state), and a second stable shape is the foregoing shape of the damping body 45 when the rotating mechanism 100 is in the flattened state (the third state). In the third state, the damping body 45 is in a maximum deformed state, and the damping body 45 in this state is in another stable shape obtained through training. It should be understood that the damping body 45 is made of a shape memory alloy material, and the microstructure of the shape memory alloy without phase transformation may be austenite, or both austenite and martensite exist in the microstructure. The austenite portion in the microstructure of the damping body 45 may be transformed into martensite when the damping member 44 changes from the first state to the third state.

As shown in FIG. 14C, the deformation amounts of the strip-shaped bodies of the damping body 45 are maximum, and the deformation amount of the damping body 45 is a point C shown in FIG. 16. If the external force is removed in this case, the deformation amount of the damping body 45 slightly decreases. In this case, the damping body 45 is in a first intermediate state, that is, reaches a point C' shown in FIG. 16, and the rotating mechanism 100 remains in a stable hovering state, that is, the rotating mechanism 100 is in a general flattened state. The first fastening plate 21 and the second fastening plate 22 are unfolded at an angle of approximately 180 degrees relative to the base 10, and a specific range of the unfolding angle may be between 160 degrees and 180 degrees. A difference from the first embodiment lies in that, in this embodiment, as shown from the point C' to a point X' in FIG. 16, when the external force is removed at the point C, the strip-shaped bodies of the damping body 45 have residual stresses. After the residual stresses are released, the deformation amounts of the strip-shaped bodies of the damping body 45 slightly decrease and then keep stable. The point C' indicates the deformation amount of the damping body 45 in this case, and the strip-shaped bodies of the damping body 45 have wrinkles in this case. Then, a first preset temperature is applied to the strip-shaped bodies, to enable the strip-shaped bodies to be restored to the third state and reach the point X' (fully flattened). The first preset temperature is a temperature applied when a stable shape (the damping body 45 is in the third state in this case) is trained for the shape memory alloy. The damping body 45 can be restored to the third state and keep in a stable shape under the action of the first preset temperature, so that the rotating mechanism 100 can keep in a fully flattened state stably.

In a possible implementation, as shown from the point C to the point X' in FIG. 16, external force may be exerted on the rotating mechanism 100, until the rotating mechanism 100 reaches a flattened state. The point C indicates the deformation amount of the damping body 45 under the external force. The rotating mechanism 100 is in a fully folded state when the external force is not removed, and a first preset temperature is applied to the strip-shaped bodies. The strip-shaped bodies can be restored to the third state and keep in stable shapes without external force under the action of the first preset temperature. The point X' in FIG. 16 indicates the deformation amount of the damping body 45 when the rotating mechanism 100 is fully flattened without external force.

The microstructure of the strip-shaped bodies to which the second preset temperature is applied can undergo phase transformation from austenite (the initial state) into martensite (the third state). In this case, the strip-shaped bodies without external force are not deformed, but keep in stable shapes, to ensure stable hovering of the rotating mechanism 100 in the flattened state.

In this embodiment, a case in which the rotating mechanism 100 changes from a flattening action to a folding action is the same as that in the first embodiment, and is not be described herein again.

Figure 17:
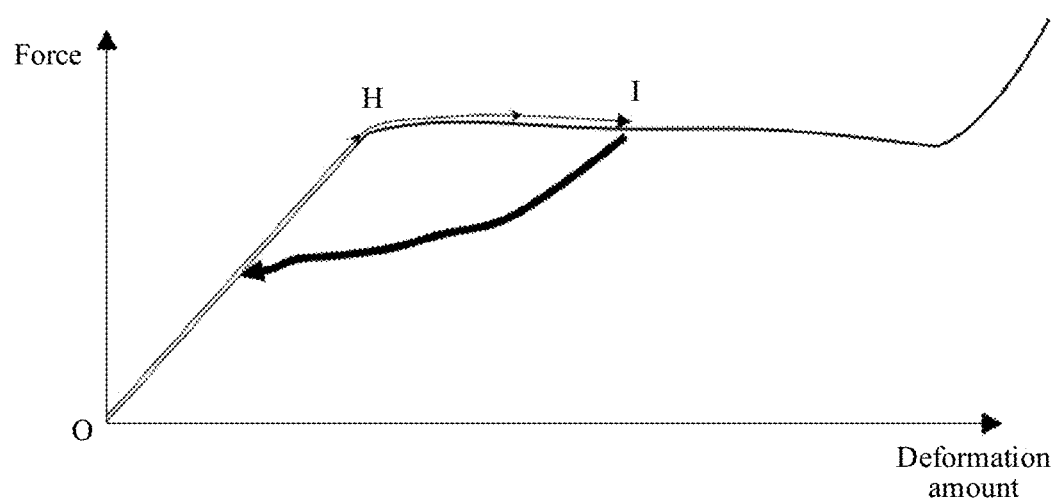
FIG. 17 is a line graph showing a relationship between deformation and external force in a third embodiment of a damping body according to an embodiment of this application.

In a third possible embodiment, a difference from the first embodiment lies in that the damping body 45 includes at least one strip-shaped body made of a super-elastic shape memory alloy. In this embodiment, the damping body 45 has four strip-shaped bodies. The damping body 45 has one stable shape, that is, the super-elastic shape memory alloy has one stable shape in shape training, and a training temperature corresponding to this stable shape is less than a room temperature. FIG. 17 is a line graph showing a relationship between deformation and external force in a third embodiment of the damping body 45 according to an embodiment of this application. When the rotating mechanism 100 is exerted by external force, refer to a point H in FIG. 17. When the external force is less than external force needed by yield stresses of the strip-shaped bodies, the strip-shaped bodies undergo elastic deformation. When the external force is greater than external force needed by yield stresses, stresses of the strip-shaped bodies exceed an elastic limit. Even if the stresses do not increase any longer, the super-elastic shape memory alloy begins to undergo obvious inelastic deformation. As shown at a point I in FIG. 17, if the external force exerted on the rotating mechanism 100 is removed, because the room temperature is greater than the training temperature of the super-elastic shape memory alloy, the super-elastic shape memory alloy is restored to a stable shape in this case, that is, the trained stable shape of the super-elastic shape memory alloy. In this case, the rotating mechanism 100 is restored to the folded state.

After the rotating mechanism 100 changes from a folded state to an unfolded state, the super-elastic shape memory alloy is deformed and generates damping force, to provide damping hand feeling for the user. After the rotating mechanism 100 or the foldable electronic device 500 using the rotating mechanism 100 is flattened, the rotating mechanism 100 or the rotating mechanism 100 is fastened by a locking member, so that the rotating mechanism 100 can keep in a stable flattened state. If the locking member of the rotating mechanism 100 is released, when no external force is exerted, a deformation amount of the super-elastic shape memory alloy can decrease, and the super-elastic shape memory alloy can be restored to the stable shape in the folded state, so that the rotating mechanism 100 or the foldable electronic device 500 using the rotating mechanism 100 is automatically folded. The locking member is disposed in the first housing 210 and the second housing 220, or on the first fastening plate 21 and the second fastening plate 22 or the base 10 of the rotating mechanism 100. The locking member may be a magnet, and is used for fastening and locking by magnetic attraction. Alternatively, the locking member can be a buckle apparatus, and is used for clamping and fastening.

In this embodiment, the damping body 45 is made of a super-elastic shape memory alloy. The super-elastic memory alloy can provide damping force in a process in which the rotating mechanism 100 changes from a folded state to an unfolded state, to provide damping hand feeling for the user. In a process in which the rotating mechanism 100 changes from an unfolded state to a folded state, due to elastic force, the super-elastic shape memory alloy enables the rotating mechanism 100 to be automatically fold, so that the foldable electronic device 500 is automatically folded without excessive external force applied. This simplifies an operation process of the user.

It should be understood that when the shape memory alloy is subjected to a specific temperature change and a mechanical stress, a microscopic unit cell structure of the shape memory alloy undergoes phase transformation (for example, may undergo phase transformation into a parent phase (austenite) or a sub-phase (martensite)), so that a macroscopic shape of the shape memory alloy changes.

A damping mechanism (the damping body 45) of a terminal structure having properties in various states can be formed through training by using the shape memory alloy. Mechanical force needed by phase transformation or deformation of the shape memory alloy is used as damping force of the folding mechanism, to provide damping hand feeling for the user and implement multi-steady and multi-angle hovering of the foldable electronic device 500. In actual use, mechanical force generated by a folding action or an unfolding action of the user can drive the shape memory alloy to undergo phase transformation or deformation and follow memorized shapes.

It should be understood that the shape memory alloy can be designed or trained to produce a variety of folding steady-state through temperature adjustment or exertion of external force. For example, the damping body 45 may be provided with corresponding steady-state phases (for example, the first state, the second state, and the third state in the foregoing embodiments) in the states when included angles between the first synchronization swing arm 41 and the second synchronization swing arm 42 are 0°, 45°, 90°, 135°, and 180°, so that the rotating mechanism 100 can hover at corresponding angles.

Figure 18:
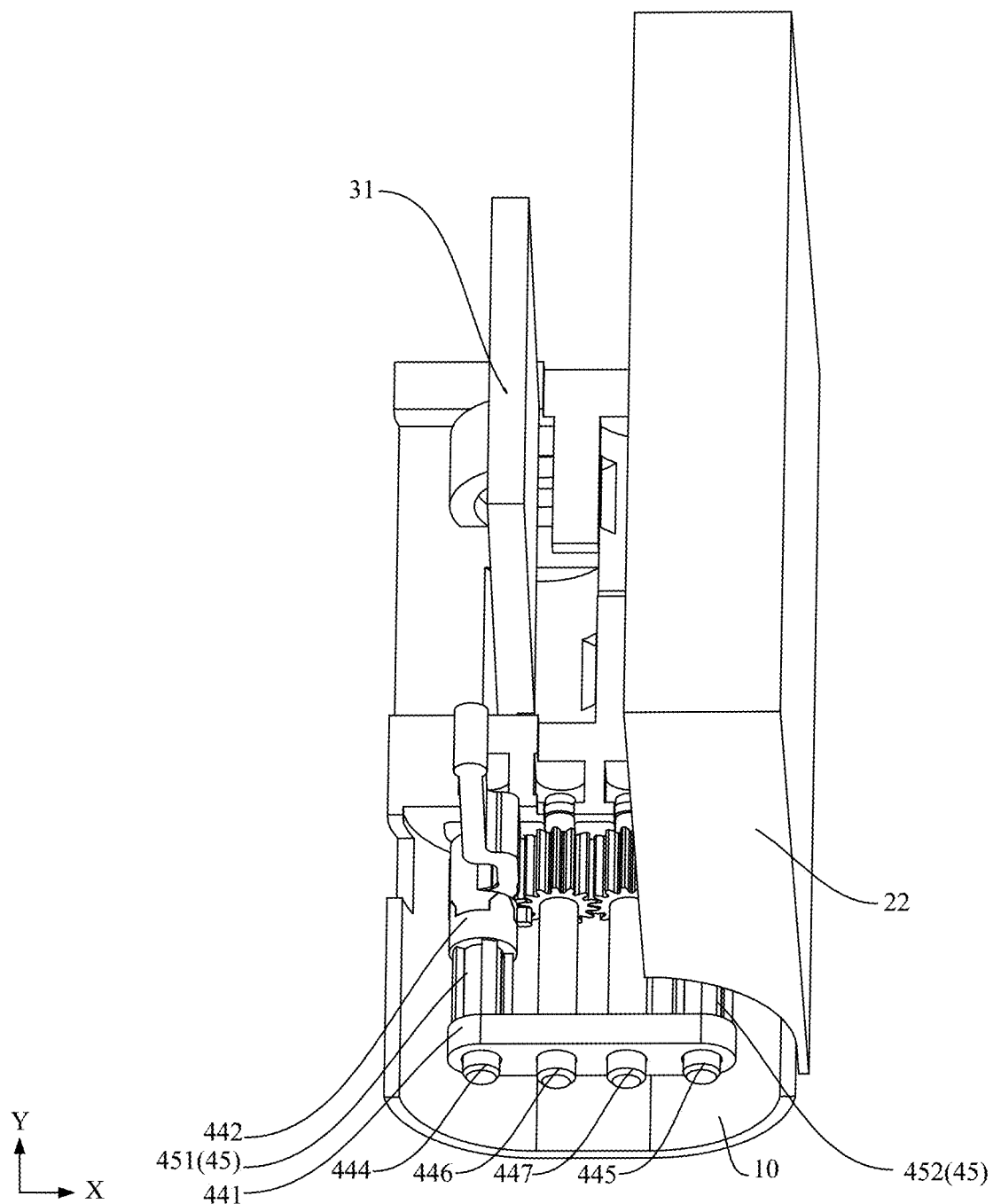
FIG. 18 is a schematic diagram of a partial structure of the rotating mechanism shown in FIG. 4 in a folded state.

FIG. 18 is a schematic diagram of a partial structure of the rotating mechanism 100 shown in FIG. 4 in a folded state.

When the rotating mechanism 100 is in the folded state, descriptions are provided based on the first embodiment of the damping body 45. The first fastening plate 21 and the second fastening plate 22 are relatively folded, the first main swing arm 31 and the second main swing arm 32 are relatively folded, and the first synchronization swing arm 41 and the second synchronization swing arm 42 are relatively folded. In this case, the damping body 45 of the damping member is in the initial state (the first state). The damping member positions the rotating mechanism 100 to the folded state, that is, the rotating mechanism 100 hovers in the folded state. The first fastening plate 21 and the second fastening plate 22 relatively hover at a specific angle, the first main swing arm 31 and the second main swing arm 32 relatively hover at a specific angle, and the first synchronization swing arm 41 and the second synchronization swing arm 42 relatively hover at a specific angle. The foldable electronic device 500 using the shown rotating mechanism 100 in the folded state is also in a folded state. The first housing and the second housing are relatively folded, and the display screen is folded, that is, the electronic device is in the folded state. Generally, the screen of the electronic device in a folded state is inoperable and protected.

Figure 19:
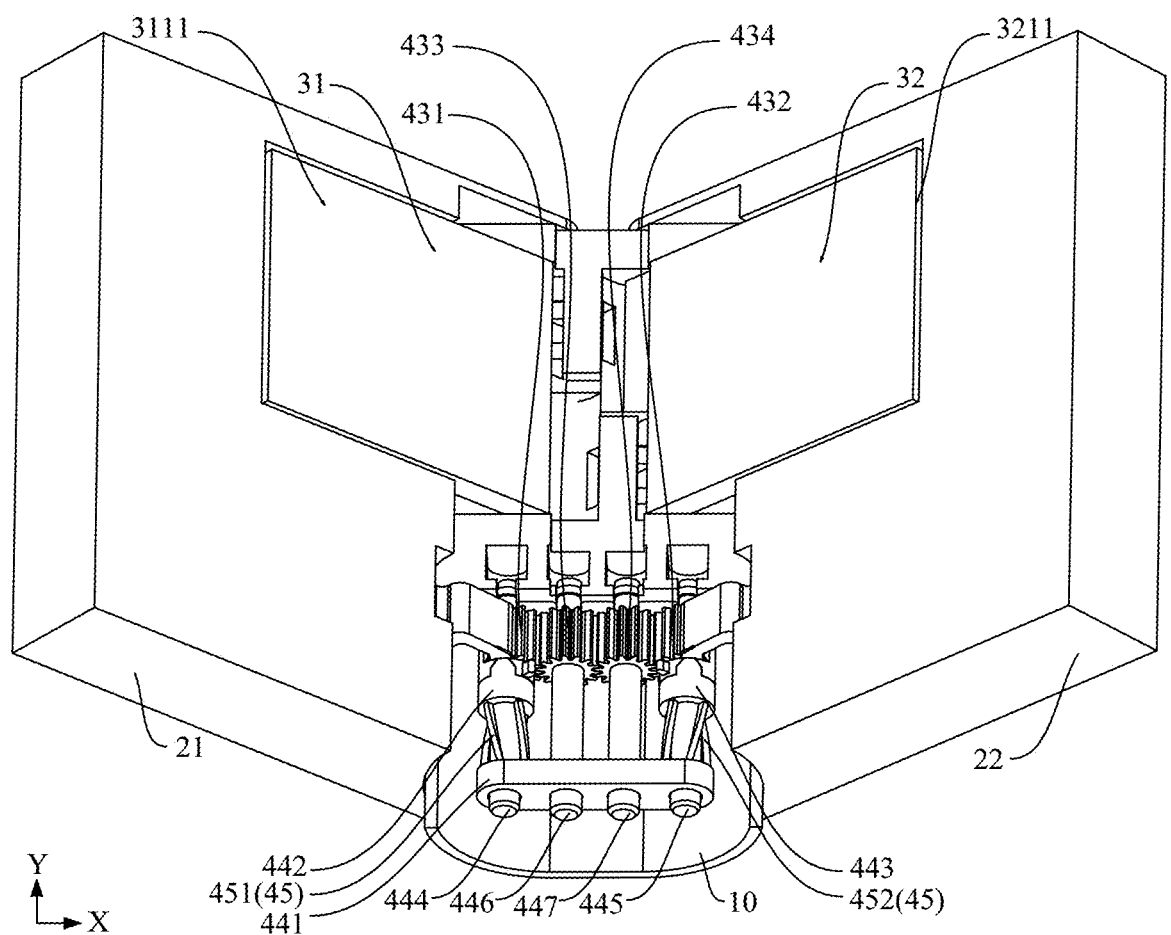
FIG. 19 is a schematic diagram of a partial structure of the rotating mechanism shown in FIG. 4 in an intermediate state between a folded state and a flattened state.

FIG. 19 is a schematic diagram of a partial structure of the rotating mechanism 100 shown in FIG. 4 in an intermediate state between a folded state and a flattened state.

When the rotating mechanism 100 is in an unfolded state from the folded state, the first fastening plate 21 is rotated counterclockwise by $\omega 1$, to drive the first main swing arm 31 to rotate counterclockwise by $\omega 1$, and the first rotating body 312 slides in the first rotating groove 111 in a direction away from the fastening base 10. In addition, the first fastening plate 21 is rotated counterclockwise by $\omega 1$, to further drive the first synchronization swing arm 41 to rotate counterclockwise by $\omega 1$, and the first synchronization swing arm 41 slides in the first sliding slot 216. When the first synchronization swing arm 41 is rotated counterclockwise by $\omega 1$, the first gear 431 is driven to rotate counterclockwise by $\omega 1$, to drive the first connecting seat 442 to rotate counterclockwise by $\omega 1$.

When the first gear 431 is rotated counterclockwise by $\omega 1$, the third gear 433 and the fourth gear 434 are further driven to rotate, to drive the second gear 432 to rotate clockwise by $\omega 2$. The first gear 431 further drives the first connecting seat 442 to rotate counterclockwise by $\omega 1$. The first connecting seat 442 drives one end of the first damping body 451 to rotate counterclockwise by $\omega 1$, and the baffle plate 441 does not move, so that the first damping body 451 is deformed (the second state). As shown in FIG. 14B and FIG. 15, the first damping body 451 is deformed and generates damping force. The second gear 432 further drives the second connecting seat 443 to rotate clockwise by $\omega 2$, to enable one end of the second damping body 452 to rotate clockwise by $\omega 2$, so that the second damping body 452 is deformed and generates damping force (the second state). The damping force generated by the first damping body 451 and the second damping body 452 through deformation provides damping hand feel for the rotating mechanism 100, to provide damping hand feel for the foldable electronic device 500. Moreover, after the external force is removed, the first damping body 451 and the second damping body 452 enable the rotating mechanism 100 to hover at a specific angle as described in the foregoing embodiments, even if the foldable electronic device 500 is folded.

Figure 20:
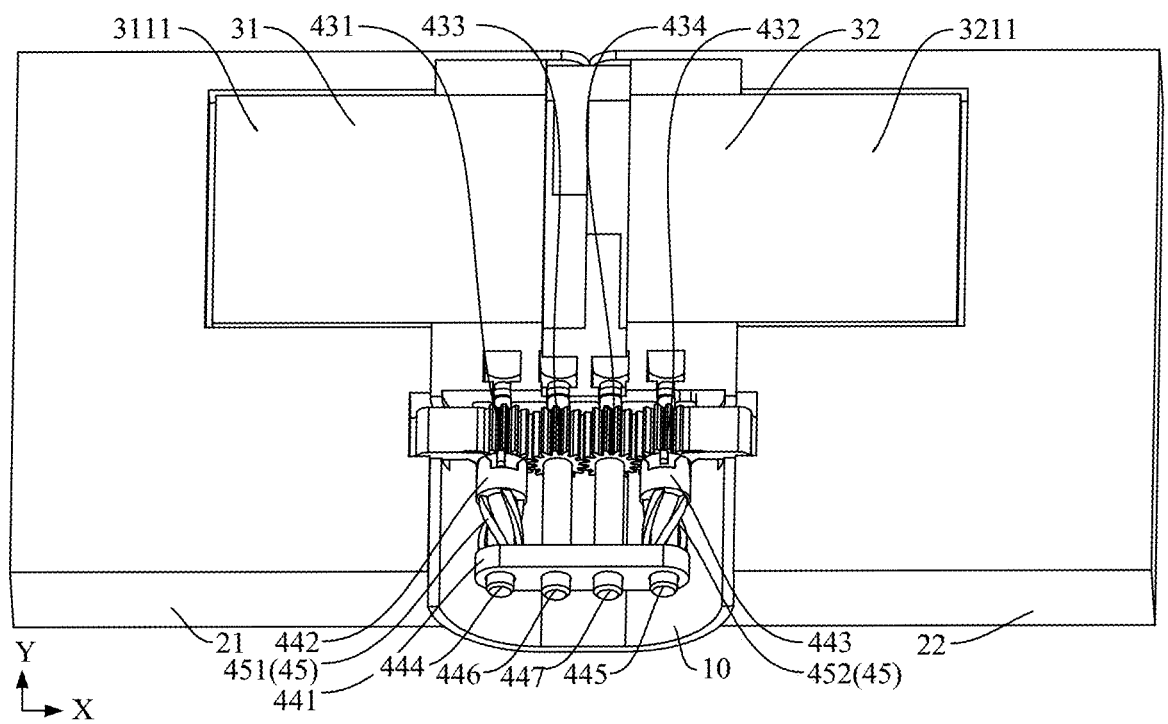
FIG. 20 is a schematic diagram of a partial structure of the rotating mechanism shown in FIG. 4 in a flattened state.

FIG. 20 is a schematic diagram of a partial structure of the rotating mechanism 100 shown in FIG. 4 in a flattened state.

Based on FIG. 19, the first fastening plate 21 continues to be rotated counterclockwise by ω1, to drive the first main swing arm 31 to continue to rotate counterclockwise by ω1, and the first rotating body 312 continues to slide in the first rotating groove 111 in the direction away from the fastening base 10. In addition, the first fastening plate 21 is rotated counterclockwise by ω1; and the first synchronization swing arm 41 drives the first gear 431 to continue to rotate counterclockwise by ω1, and drives the second gear 432, the second synchronization swing arm 42, and the second fastening plate 22 to rotate clockwise by ω2. When the first gear 431 continues to be rotated counterclockwise by ω1, the first connecting seat 442 is driven to continue to rotate, and the first connecting seat 442 drives the first damping body 451 to be further deformed until the rotating mechanism 100 is folded.

Moreover, the second gear 432 is rotated clockwise by ω2, to further drive the second synchronization swing arm 42 to rotate clockwise by ω2, and drive the second fastening plate 22 to rotate clockwise by ω2; and the second synchronization swing arm 42 slides in the second sliding slot 226, so that the rotating mechanism 100 is rotated to a folded state. The second gear 432 also drives the second connecting seat 443 to rotate, and the second connecting seat 443 drives the second damping body 452 to be further deformed until the rotating mechanism 100 is folded. In this case, the first damping body 451 and the second damping body 452 are deformed (the third state), and deformation of the first damping body 451 and the second damping body 452 can provide damping hand feeling for the rotating mechanism 100, thereby improving use experience of the user.

Then, the flattened rotating mechanism 100 is folded again. In the first embodiment of the damping body 45, the external force is removed after the damping body 45 is flattened, and the deformation amount slightly decreases and then keeps stable. Therefore, the damping body 45 in the first embodiment is deformed starting from a shape with a deformation amount slightly less than that in the third state, until the damping body 45 changes to the first state shown in FIG. 14A. The rotating mechanism 100 completes the folding action under the action of external force, and the first synchronization swing arm 41 and the second synchronization swing arm 42 are relatively close to each other until the rotating mechanism 100 is fully folded.

Descriptions are provided based on the second embodiment of the damping body 45. The rotating mechanism 100 is in a flattened state from the folded state, and correspondingly the damping body is in the third state. A second preset temperature may be applied to the damping body 45. The second preset temperature may cause the damping body 45 to undergo phase transformation (from austenite in the folded state to martensite in the flattened state), and the phase transformation of the damping body 45 enables the shape of the damping body 45 to change (from the first state of the damping body 45 shown in FIG. 14A to the third state shown in FIG. 14C). In other words, the third state of the damping body 45 can keep stable when the rotating mechanism 100 is in the flattened state.

The rotating mechanism 100 in the second embodiment changes from a flattened state to a folded state under the action of external force, the first synchronization swing arm 41 and the second synchronization swing arm 42 start to be relatively folded from a relatively unfolded state, and the damping member 44 in the second embodiment provides damping force for the first synchronization swing arm 41 and the second synchronization swing arm 42 in this process. The damping body 45 in the second embodiment is folded from the fully flattened state of the rotating mechanism 100, that is, restored to the first state from the third state of the damping body 45. Changes in the deformation amount and the damping force of the damping body 45 are shown in FIG. 15, and are not described again.

The damping body 45 in the third embodiment is made of a super-elastic shape memory alloy. The super-elastic shape memory alloy provides damping force in a process in which the first synchronization swing arm 41 and the second synchronization swing arm 42 are in a relatively unfolded state from a relatively folded state, and does not provide damping force in a process in which the first synchronization swing arm 41 and the second synchronization swing arm 42 are in a relatively folded state from a relatively unfolded state.

It should be noted that damping hand feel of the rotating mechanism 100 can be understood as damping force exerted on the first synchronization swing arm 41 and the second synchronization swing arm 42 during rotation, that is, acting force exerted by the damping member 44 on the synchronization gear 43.

In this embodiment, the damping body 45 is disposed, so that damping force exerted on the synchronization assembly 40 during rotation is resistance generated during elastic deformation or inelastic deformation of the damping body 45. The elastic deformation of the damping body 45 occurs before the yield stress of the damping body 45, and the inelastic deformation of the damping body occurs after the yield stress of the damping body 45. With same damping force attainable by the rotating mechanism 100, a quantity of damping bodies 45 can be reduced, so that the structure of the rotating mechanism 100 can be simplified, and the assembly difficulty, weight, and costs of the rotating mechanism 100 can be reduced. In addition, it is conducive to reducing a volume of the rotating mechanism 100, to implement thinning and lightness of the foldable electronic device 500.

Still with reference to FIG. 20, when the rotating mechanism 100 is in the flattened state, the first fastening plate 21 and the second fastening plate 22 are relatively unfolded, the first main swing arm 31 and the second main swing arm 32 are relatively unfolded, and the first synchronization swing arm 41 and the second synchronization swing arm 42 are relatively unfolded. In this case, the damping body 45 of the damping member 44 is in the maximum deformed state (the third state). After the external force exerted on the first synchronization swing arm 41 and the second synchronization swing arm 42 is removed, the damping member 44 in the first embodiment is slightly deformed from the shape in the third state and then keeps stable. The damping member 44 in the second embodiment keeps in the shape in the third state and positions the rotating mechanism 100 to the flattened state, that is, the rotating mechanism 100 hovers in the flattened state.

In the third embodiment, the locking member fastens the rotating mechanism 100 to the flattened state, the damping member 44 is in the maximum deformed state (the third state), and the damping member 44 has elastic force in this case. The elastic force of the damping member 44 enables the rotating mechanism 100 to be automatically folded from the flattened state after the locking member is released.

In a possible implementation, when the foldable electronic device 500 is folded or unfolded, a connecting shaft is stationary relative to the fastening base 10, the first gear 431 may be rotated relative to the first connecting shaft 444, the first connecting seat 442 may be rotated relative to the first connecting shaft 444 to drive one end of the first damping body 451 to rotate relative to the first connecting shaft 444, and both the baffle plate 441 and one end that is of the first damping body 451 and that is connected to the baffle plate 441 remain stationary relative to the first connecting shaft 444. The other end of the second connecting shaft 445 sequentially passes through the third through hole 4331 and the second mounting hole 4412, and is invariably connected to the baffle plate 441. The third gear may be rotated relative to the second connecting shaft 445, and the baffle plate 441 is stationary relative to the second connecting shaft 445. The other end of the third connecting shaft 446 sequentially passes through the fourth through hole 4341 and the third mounting hole 4413, and is invariably connected to the baffle plate 441. The fourth gear 434 may be rotated relative to the third connecting shaft 446, and the baffle plate 441 may be stationary relative to the third connecting shaft 446. The other end of the fourth connecting shaft 447 sequentially passes through the second through hole 4321, the sixth mounting hole 4431, the second damping body 452, and the fourth mounting hole 4414, and is invariably connected to the baffle plate 441. The second gear 432 may be rotated relative to the fourth connecting shaft 447, and the baffle plate 441 and one end that is of a fourth damping body 45 and that is connected to the baffle plate 441 may be stationary relative to the fourth connecting shaft 447. In another possible implementation, a connecting shaft may be rotated relative to the baffle plate 441 and the fastening base 10, that is, the connecting shaft may be rotated along an axis of the connecting shaft. It is understood that rotation of the connecting shaft does not affect a folding action or an unfolding action of the foldable electronic device 500. Therefore, whether the connecting shaft is rotated is not limited herein.

It can be understood that a damping body 45 is sleeved at a periphery of a connecting shaft, so that the connecting shaft fastens the corresponding damping body 45. This can prevent any damping body 45 from deviating from a Y-axis direction.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A rotating mechanism, comprising a fastening base, a first synchronization swing arm, a second synchronization swing arm, and a damping member; wherein
the first synchronization swing arm and the second synchronization swing arm are respectively mounted on two opposite sides of the fastening base in a width direction and are rotatably connected to the fastening base;
the damping member comprises a baffle plate and a damping body, one end of the damping body is connected to the first synchronization swing arm, the other end of the damping body is connected to the baffle plate, two opposite ends of the damping body are disposed along a length direction of the fastening base, and the damping body is made of a shape memory alloy;
when the first synchronization swing arm and the second synchronization swing arm are in a folded state, the damping body is in a first state, wherein the first state is an initial state of the damping body; and
the first synchronization swing arm is rotated relative to the fastening base to drive one end of the damping body to rotate, the first synchronization swing arm and the second synchronization swing arm are relatively unfolded from the folded state, and the damping body is in a second state, wherein the second state is that the damping body is deformed and generates damping force relative to the first synchronization swing arm.

2. The rotating mechanism according to claim 1, wherein when the first synchronization swing arm and the second synchronization swing arm are in a flattened state, the damping body is in a third state, wherein the third state is that the damping body is in a deformed state and that the damping body generates damping force relative to the first synchronization swing arm.

3. The rotating mechanism according to claim 1, wherein the damping force of the damping body enables the first synchronization swing arm and the second synchronization swing arm to be positioned relative to the fastening base.

4. The rotating mechanism according to claim 2, wherein the damping body has a first intermediate state, a deformation amount in the first intermediate state is less than that in the third state, and a first preset temperature is applied to the damping body in the first intermediate state, so that a microstructure of the damping body changes at the first preset temperature, and the damping body changes from the first intermediate state to the third state.

5. The rotating mechanism according to claim 1, wherein when the first synchronization swing arm and the second synchronization swing arm change from the flattened state to the folded state, the damping body changes from the third state to a second intermediate state, a deformation amount in the second intermediate state is greater than that in the first state, and a second preset temperature is applied to the damping body in the second intermediate state, so that the microstructure of the damping body changes at the second preset temperature, and the damping body changes from the second intermediate state to the first state.

6. The rotating mechanism according to claim 2, wherein there are two damping bodies: a first damping body and a second damping body, one end of the first damping body is connected to the first synchronization swing arm, the other end of the first damping body is connected to the baffle plate, one end of the second damping body is connected to the second synchronization swing arm, and the other end of the second damping body is connected to the baffle plate.

7. The rotating mechanism according to claim 6, wherein the first synchronization swing arm and the second synchronization swing arm are relatively unfolded, the first damping body exerts force whose direction is opposite to a movement direction of the first synchronization swing arm on the first synchronization swing arm, and the second damping body exerts force whose direction is opposite to a movement direction of the second synchronization swing arm on the second synchronization swing arm.

8. The rotating mechanism according to claim 1, wherein the first synchronization swing arm is rotated through external force, the first synchronization swing arm is rotated away from the second synchronization swing arm, and after the external force is removed, resilience of the damping body enables the first synchronization swing arm and the second synchronization swing arm to be relatively folded.

9. The rotating mechanism according to claim 1, wherein the rotating mechanism further comprises a synchronization gear and a first connecting shaft, both the first synchronization swing arm and the second synchronization swing arm are connected to the synchronization gear, one end of the first connecting shaft is connected to the synchronization gear, the other end of the first connecting shaft is connected to the baffle plate, a length direction of the first connecting shaft is the same as that of the fastening base, and the first connecting shaft is spaced from the fastening base; and the damping body comprises a plurality of strip-shaped bodies, one end of the strip-shaped body of the damping body is connected to the synchronization gear, the other end of the strip-shaped body of the first damping body is connected to the baffle plate, and the plurality of strip-shaped bodies are disposed around the first connecting shaft.

10. The rotating mechanism according to claim 6, wherein the rotating mechanism further comprises a synchronization gear, a first connecting shaft, and a second connecting shaft, both the first synchronization swing arm and the second synchronization swing arm are connected to the synchronization gear, one end of the first connecting shaft is connected to the synchronization gear, the other end of the first connecting shaft is connected to the baffle plate, one end of the second connecting shaft is connected to the synchronization gear, the other end of the second connecting shaft is connected to the baffle plate, length directions of the first connecting shaft and the second connecting shaft are the same as that of the fastening base, and the first connecting shaft and the second connecting shaft are spaced from the fastening base; and the first damping body and the second damping body each comprise a plurality of strip-shaped bodies, one end of the strip-shaped body of the first damping body is connected to the synchronization gear, the other end of the strip-shaped body of the first damping body is connected to the baffle plate, the plurality of strip-shaped bodies of the first damping body are disposed around the first connecting shaft, one end of the strip-shaped bodies of the second damping body is connected to the synchronization gear, the other end of the strip-shaped bodies of the second damping body is connected to the baffle plate, and the plurality of strip-shaped bodies of the second damping body are disposed around the second connecting shaft.

11. The rotating mechanism according to claim 9, wherein the synchronization gear comprises a first gear, intermediate gears, and a second gear, the intermediate gears are located between the first gear and the second gear and are engaged with the first gear and the second gear, the first synchronization swing arm is invariably connected to the first gear, the second synchronization swing arm is invariably connected to the second gear, and rotation directions of the first gear and the second gear are opposite.

12. The rotating mechanism according to claim 11, wherein the rotating mechanism further comprises a third connecting shaft and a fourth connecting shaft, and the intermediate gears comprise a third gear and a fourth gear; and one end of each of the first connecting shaft, the second connecting shaft, the third connecting shaft, and the fourth connecting shaft is connected to the base and these connecting shafts are disposed in parallel, the other ends of the third connecting shaft and the fourth connecting shaft are both connected to the baffle plate, the first gear is sleeved on the first connecting shaft, the second gear is sleeved on the second connecting shaft, the third gear is sleeved on the third connecting shaft, and the fourth gear is sleeved on the fourth connecting shaft.

13. The rotating mechanism according to claim 12, wherein the rotating mechanism further comprises a first fastening plate and a second fastening plate, the first fastening plate and the second fastening plate are respectively located at the two opposite sides of the fastening base in the width direction, the first fastening plate is slidably connected to the first synchronization swing arm, and the second fastening plate is slidably connected to the second synchronization swing arm.

14. The rotating mechanism according to claim 13, wherein the fastening base is provided with a first rotating groove and a second rotating groove, the first rotating groove and the second rotating groove are disposed opposite to each other, the rotating mechanism comprises a first main swing arm and a second main swing arm, the first main swing arm is mounted in the first rotating groove and is capable of sliding along the first rotating groove, the first main swing arm is connected to the first fastening plate, the second main swing arm is mounted in the second rotating groove and is capable of sliding along the second rotating groove, and the second main swing arm is connected to the second fastening plate; and when the first fastening plate is rotated relative to the fastening base, the first main swing arm is driven to rotate relative to the fastening base, and when the second fastening plate is rotated relative to the fastening base, the second main swing arm can be driven to rotate relative to the fastening base.

15. The rotating mechanism according to claim 8, wherein the rotating mechanism further comprises a locking member, the first synchronization swing arm is rotated through external force and is in an unfolded state or a folded state relative to the second synchronization swing arm, and the locking member fastens the first synchronization swing arm and the second synchronization swing arm.

16. A foldable electronic device, comprising a first housing, a second housing, a display screen, and the rotating mechanism according to claim 1, wherein the rotating mechanism is connected between the first housing and the second housing, the display screen is mounted on the first housing, the second housing, and the rotating mechanism, and when the rotating mechanism is rotated, the first housing and the second housing are rotated relative to each other, to drive the display screen to bend or unfold.

17. The foldable electronic device according to claim 16, wherein the electronic device further comprises a locking member, the first synchronization swing arm is rotated through external force and is in an unfolded state or a folded state relative to the second synchronization swing arm, and the locking member fastens the first synchronization swing arm and the second synchronization swing arm.

* * * * *